(12) United States Patent  
Yamashita et al.

(10) Patent No.: US 10,141,575 B2  
(45) Date of Patent: Nov. 27, 2018

(54) ELECTRODE, NONAQUEOUS ELECTROLYTE BATTERY, BATTERY PACK, AND VEHICLE

(71) Applicant: KABUSHIKI KAISHA TOSHIBA, Minato-ku (JP)

(72) Inventors: Yasunobu Yamashita, Tokyo (JP); Keigo Hoshina, Kashiwazaki (JP); Tetsuya Sasakawa, Yokohama (JP); Yoshiyuki Isozaki, Tokyo (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 78 days.

(21) Appl. No.: 15/459,242

(22) Filed: Mar. 15, 2017

(65) Prior Publication Data

US 2018/0083284 A1  Mar. 22, 2018

(30) Foreign Application Priority Data

Sep. 21, 2016  (JP) .................................. 2016-183705

(51) Int. Cl.  
H01M 4/485  (2010.01)  
H01M 4/505  (2010.01)  
H01M 4/525  (2010.01)  
H01M 4/58   (2010.01)  
H01M 4/62   (2006.01)  
(Continued)

(52) U.S. Cl.  
CPC ........... *H01M 4/628* (2013.01); *H01M 4/131* (2013.01); *H01M 4/366* (2013.01); *H01M 4/485* (2013.01); *H01M 4/505* (2013.01); *H01M 4/525* (2013.01); *H01M 4/5825* (2013.01); *H01M 10/052* (2013.01); *H01M 10/425* (2013.01);  
(Continued)

(58) Field of Classification Search  
CPC ...... H01M 4/131; H01M 4/366; H01M 4/485; H01M 4/505; H01M 4/525; H01M 4/5825; H01M 4/628; H01M 10/052; H01M 10/425; H01M 10/44; H01M 2004/027; H01M 2220/20  
See application file for complete search history.

(56) References Cited

U.S. PATENT DOCUMENTS

2006/0134524 A1  6/2006  Nakai et al.  
2007/0082265 A1  4/2007  Itou et al.  
(Continued)

FOREIGN PATENT DOCUMENTS

JP   10-284053    10/1998  
JP   2002-270152   9/2002  
(Continued)

*Primary Examiner* — Brittany L Raymond  
(74) *Attorney, Agent, or Firm* — Oblon, McClelland, Maier & Neustadt, L.L.P.

(57) ABSTRACT

According to one embodiment, an electrode is provided. The electrode includes a current collector and an electrode layer. The electrode layer is disposed on the current collector and includes lithium fluoride. A first content of lithium fluoride in a first region is 0.02% by weight or more and less than 2% by weight. The first region is adjacent to an interface between the electrode layer and the current collector, and has a first thickness equal to 20% with respect to a thickness of the electrode layer. A second content of lithium fluoride in a second region is from 2% by weight to 10% by weight. The second region is adjacent to a surface on a reverse side of the electrode layer, and has the first thickness.

11 Claims, 6 Drawing Sheets

(51) Int. Cl.
*H01M 10/42* (2006.01)
*H01M 10/44* (2006.01)
*H02J 7/14* (2006.01)
*H01M 4/131* (2010.01)
*H01M 4/36* (2006.01)
*H01M 10/052* (2010.01)
*H01M 4/02* (2006.01)

(52) U.S. Cl.
CPC ........... H01M 10/44 (2013.01); H02J 7/1461 (2013.01); *H01M 2004/027* (2013.01); *H01M 2220/20* (2013.01)

(56) References Cited

U.S. PATENT DOCUMENTS

| | | |
|---|---|---|
| 2008/0113270 A1 | 5/2008 | Hirose et al. |
| 2009/0061292 A1 | 3/2009 | Inagaki et al. |
| 2012/0064401 A1 | 3/2012 | Liu et al. |
| 2013/0280599 A1 | 10/2013 | Matsumoto et al. |
| 2015/0194655 A1 | 7/2015 | Toyoshima |

FOREIGN PATENT DOCUMENTS

| | | |
|---|---|---|
| JP | 2005-190996 | 7/2005 |
| JP | 2005-302601 | 10/2005 |
| JP | 2006-179305 | 7/2006 |
| JP | WO 2012/093616 A1 | 7/2012 |
| JP | 5184846 | 4/2013 |
| KR | 10-2007-0095218 A | 9/2007 |
| KR | 10-2015-0034285 A | 4/2015 |

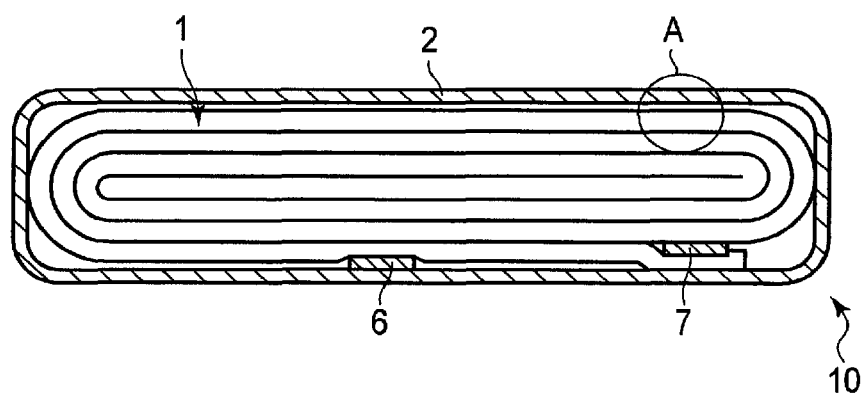
F I G. 1

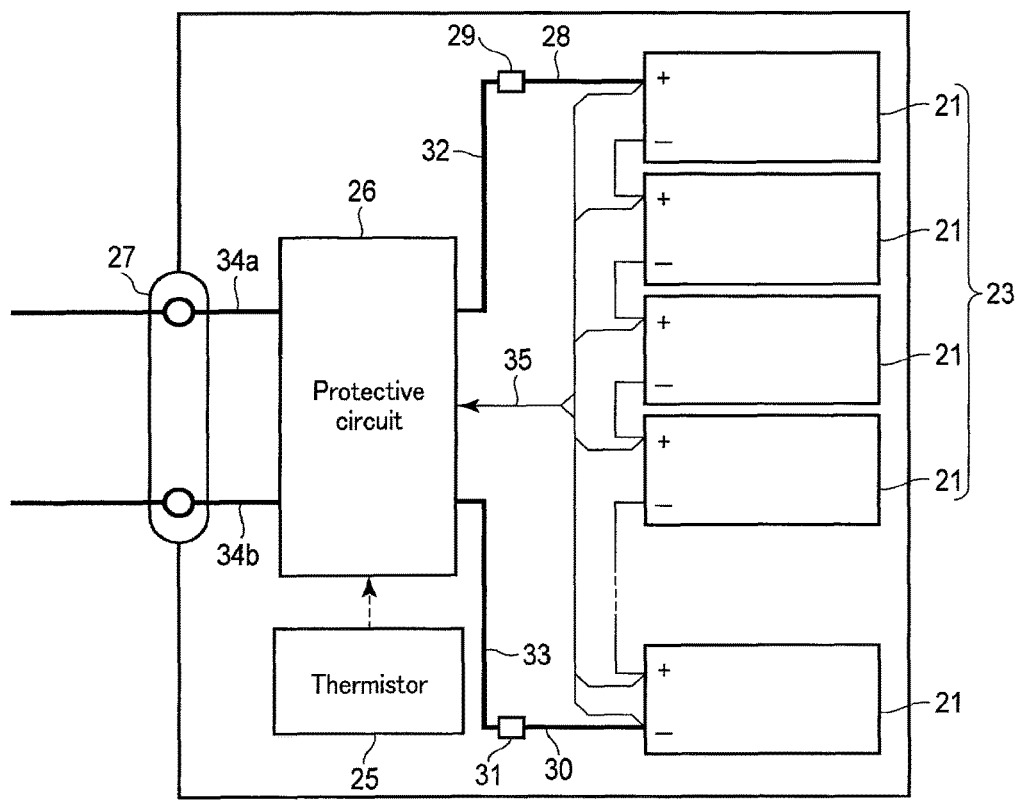
F I G. 6

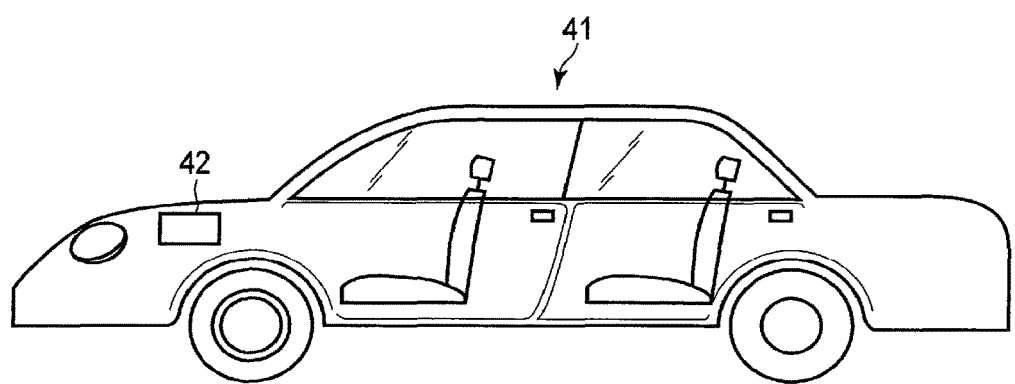
F I G. 7

ELECTRODE, NONAQUEOUS ELECTROLYTE BATTERY, BATTERY PACK, AND VEHICLE

CROSS-REFERENCE TO RELATED APPLICATION

This application is based upon and claims the benefit of priority from Japanese Patent Application No. 2016-183705, filed Sep. 21, 2016; the entire contents of which is incorporated herein by reference.

FIELD

Embodiments relate to an electrode, a nonaqueous electrolyte battery, a battery pack, and a vehicle.

BACKGROUND

In batteries whose negative electrodes contain oxide of titanium as an active material, the operating potential is higher than those of batteries including general graphite-based negative electrodes, and the specific surface area of the negative electrode is lower too. Thus, batteries using oxide of titanium are hardly affected by side reaction with a nonaqueous electrolyte (electrolyte solution). However, under high temperature conditions, even for the negative electrode using oxide of titanium, side reaction with a nonaqueous electrolyte or an adsorbed component has been seen as a problem. Such side reaction may cause reduction in cycle performance, for example.

BRIEF DESCRIPTION OF THE DRAWINGS

FIG. 1 is a cross-sectional view of an example of a nonaqueous electrolyte battery according to a second embodiment;

FIG. 6 is a block diagram showing an electric circuit of the battery pack of FIG. 5;

FIG. 7 is a schematic diagram showing an example of a vehicle including the battery pack according to the third embodiment.

DETAILED DESCRIPTION

Figure 2:
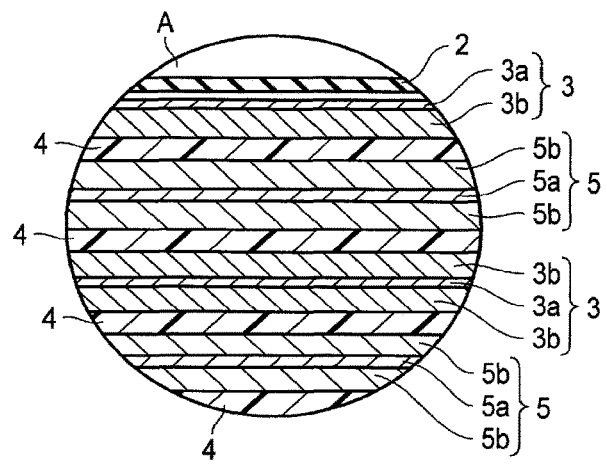
FIG. 2 is an enlarged cross-sectional view showing a portion A in FIG. 1.

According to an embodiment, an electrode is provided. The electrode includes a current collector and an electrode layer. The electrode layer is disposed on the current collector and includes lithium fluoride. A first content of lithium fluoride based on a weight of the electrode layer in a first region of the electrode layer is within a range of 0.02% by weight or more and less than 2% by weight. The first region is adjacent to an interface between the electrode layer and the current collector, and has a first thickness equal to 20% with respect to a thickness of the electrode layer. Further, a second content of lithium fluoride based on a weight of the electrode layer in a second region of the electrode layer is within a range of from 2% by weight to 10% by weight. The second region is adjacent to a surface on a reverse side of the electrode layer with respect to the interface between the electrode layer and the current collector, and has the first thickness.

According to another embodiment, a nonaqueous electrolyte battery is provided. The nonaqueous electrolyte battery includes a positive electrode, a negative electrode, and a nonaqueous electrolyte. The negative electrode includes an active material including a titanium-containing oxide. At least one of the positive electrode and the negative electrode includes the electrode of the above embodiment.

According to still another embodiment, a battery pack is provided. The battery pack includes the above nonaqueous electrolyte battery.

According to still further another embodiment, a vehicle is provided. This vehicle includes the above battery pack.

It has been reported that when a coating of a Li compound is formed onto a surface of an electrode using a carbonaceous material such as graphite, or when a carbonaceous material as an active material is covered with a Li compound, gas adsorption to the electrode is suppressed, so that performance of a battery using this electrode, such as the battery capacity, is improved. Further, it has been reported that when oxide of titanium as a negative electrode active material is doped with fluorine, life performance under a high temperature environment of 60° C. or more can be improved. Furthermore, it has been reported that when a surface of lithium nickel oxide like lithium nickel cobalt manganese composite oxide (so-called ternary type positive electrode active material) is covered with a Li compound, gas generation during storage under a high temperature environment of approximately 60° C. can be suppressed. In addition, it has been reported that when a negative electrode including, as a negative electrode active material, alloy including silicon (Si) and tin (Sn) as constituent elements is used, an effect of reducing decomposition reaction of an electrolyte by formation of a layer of a Li compound on a surface of the negative electrode can be expected, so that the cycle performance can be improved.

According to those reports, although such an excellent effect that the life performance is stabilized can be expected, there is concern about a resistance increase because an active material and an electrode are covered with a Li compound. In addition, a process for forming a covering layer on an active material surface or a process for forming a coating on an electrode surface is required, for example.

Electrodes according to embodiments include lithium fluoride in a range of from 2% by weight to 10% by weight in a 20% thickness region near a surface layer of an electrode layer (electrode mixed-materials layer), and in a range of 0.02% by weight or more and less than 2% by weight in a 20% thickness region near an interface with a current collector.

When such an electrode is used as at least one of a positive electrode and a negative electrode, in a nonaqueous electrolyte battery using a titanium-containing oxide based negative electrode, an effect of improving the cycle performance under high temperature and an effect of reducing side reaction can be expected. Since lithium fluoride can be mixed with an active material or a conductive agent during an electrode production process, a new process is not required to be added during the electrode production process. Lithium fluoride is dispersed inside an electrode mixed-materials layer and does not form a covering layer. Thus, the resistance increase due to introduction of lithium fluoride is slight.

First Embodiment

According to the first embodiment, an electrode is provided. The electrode includes a current collector and an electrode layer. The electrode layer is disposed on the current collector and includes lithium fluoride. A content of lithium fluoride based on a weight of the electrode layer is within a range of 0.02% by weight or more and less than 2% by weight in a 20% thickness region with respect to a thickness of the electrode layer. The 20% thickness region lies from an interface between the electrode layer and the current collector toward an inside of the electrode layer. Further, the content of lithium fluoride is within a range of from 2% by weight to 10% by weight in another 20% thickness region with respect to the thickness of the electrode layer. The other 20% thickness region lies from a surface on the reverse side of the electrode layer with respect to the interface between the electrode layer and the current collector toward the inside of the electrode layer.

Although details of the method of manufacturing an electrode according to the embodiment will be described later, the electrode layer may be an electrode layer formed on the current collector. The electrode layer may be formed on one surface or both surfaces (both of, one surface and the other surface on the reverse side) of the current collector.

At least a portion of the electrode layer disposed on the current collector is in contact with the current collector. The thickness of the electrode layer at the portion in contact with the current collector may be, for example, a distance (span) from an interface where the current collector and the electrode layer are in contact with each other to a surface of the electrode layer on the opposite side to this interface. On the other hand, there is a case in which there is a portion where the current collector and the electrode layer are not in contact with each other. At a portion where the electrode layer is thus lifted off from the current collector, a surface of the electrode layer facing the current collector is treated as an interface, and a distance (span) from this surface to a surface on the reverse side may be a thickness of the electrode layer.

The surface on the reverse side of the electrode layer with respect to the interface between the current collector and the electrode layer may be a surface of an electrode. The content of lithium fluoride is relatively high in a 20% thickness region from this surface to the inside of the electrode layer, that is, near a surface layer of the electrode layer (near the electrode surface).

On the other hand, when the electrode layers are formed on both surfaces of the current collector, the interface between the current collector and the electrode layer may be located inside in a depth direction of the electrode. The content of lithium fluoride is relatively low in a 20% thickness region from a surface of the electrode layer on the current collector side to the inside of the electrode layer, that is, near the interface between the current collector and the electrode layer.

When distribution of lithium fluoride within the electrode layer has a gradient in a thickness direction of the electrode as described above, decomposition of a nonaqueous electrolyte can be effectively suppressed. In general, decomposition reaction of the nonaqueous electrolyte often occurs with decomposition of Li salt as a starting point. For example, $LiPF_6$ tends to be decomposed into $PF_5$ and LiF, and the produced $PF_5$ reacts with an active material surface, a solvent, or the like through nucleophilic substitution. In the above electrode, lithium fluoride (LiF) dispersed in the electrode is dissolved into the nonaqueous electrolyte, and an effect of reducing side reaction is exerted by suppressing decomposition of Li salt like $LiPF_6$ due to an equilibrium effect.

Although a Li compound like lithium fluoride (LiF) has low solubility with respect to an organic solvent, this does not mean that the Li compound does not dissolve at all. It is also known that for such a Li compound, the solubility is enhanced in the presence of Lewis acid like $LiPF_6$. A Li salt concentration in a depth direction toward the inside of the electrode becomes lower, proceeding from the surface toward the inside, that is, proceeding from the electrode layer surface toward the current collector. Thus, setting a concentration gradient of a Li compound dispersed in the electrode in the electrode depth direction may correspond to correlating the concentration of the Li compound to the Li salt concentration in a nonaqueous electrolyte. This can minimize the resistance increase of the electrode due to mixing of the Li compound into the electrode layer, as compared to a case in which the Li compound is uniformly dispersed in the electrode, for example.

As described above, in the embodiments, regarding a Li compound like lithium fluoride, an attention is paid to effects fundamentally different from a function as Li salt and a surface protection function, that has been reported. Although a similar effect can be expected even if lithium fluoride is included in a nonaqueous electrolyte, when an excessive amount of lithium fluoride is contained, there is concern that lithium fluoride present as a solid in the nonaqueous electrolyte causes clogging in an injection process. In addition, when a solid-state additive is dispersed in a nonaqueous electrolyte, this may cause clogging of a separator.

The above effect can be obtained when the content of a Li compound is from 2% by weight or more to 10% by weight or less in the 20% thickness region near the surface layer of the electrode layer, and is 0.02% by weight or more and less than 2% by weight in the 20% thickness region near the interface with the current collector. In each region, when the content is less than the lower limit of the above range, the effect of reducing side reaction cannot be satisfactorily obtained. In each region, when the content is more than the upper limit of the above range, the resistance increase of the electrode becomes large. The content of lithium fluoride is preferably from 2% by weight to 6% by weight near the surface layer of the electrode layer, that is, in the 20% thickness region of the electrode layer from a surface of the electrode layer located on the reverse side with respect to the interface between the current collector and the electrode layer. Further, the content of lithium fluoride is preferably from 0.02% by weight to 1% by weight near the interface between the current collector and the electrode layer, that is, in the 20% thickness region of the electrode layer from a surface of the electrode layer in contact with or facing the current collector. When these ranges are satisfied, suppression of the resistance increase and reduction in side reaction can be satisfactorily achieved simultaneously.

It is preferable that concentration distribution of lithium fluoride (distribution of the content of lithium fluoride) in the thickness direction of the electrode is consistently reduced from the surface layer of the electrode layer toward the interface with the current collector. In other words, it is preferable that in a range of the concentration of lithium fluoride in a 20%-80% thickness region from the surface layer of the electrode layer, a maximum value ($C_{max}$) is equal to a value of the content of lithium fluoride in the 20% thickness region near the surface layer of the electrode layer, and a minimum value ($C_{min}$) is equal to a value of the content of lithium fluoride in the 20% thickness region near the interface between the electrode layer and the current collector. In the 20%-80% thickness region from the surface layer of the electrode layer, when the maximum value ($C_{max}$) of the concentration of lithium fluoride is more than the content of lithium fluoride in the 20% thickness region near the surface layer of the electrode layer, a resistance value of an electrode may become high. When the minimum value ($C_{min}$) is less than the content of lithium fluoride near the interface between the electrode layer and the current collector, the effect of reducing side reaction may be deteriorated.

Said another way, it is preferable for a third region (the 20%-80% thickness region from the surface layer of the electrode layer) between the 20% thickness region near the interface between the electrode layer and the current collector (here, referred to as a first region, for sake of clarity), and the 20% thickness region near the surface layer of the electrode layer (here, referred to as a second region, for sake of clarity) to have a third content of lithium fluoride within a range of from the content of lithium fluoride in the first region (i.e., a first content of lithium fluoride) to the content of lithium fluoride in the second region (i.e., a second content of lithium fluoride). When the third content of lithium fluoride in the third region between the first region and second region is thus within a range of from the first content to the second content, side reactions can be satisfactorily reduced, without increasing the resistance value of the electrode.

When the electrode according to the embodiment is used as a negative electrode of a nonaqueous electrolyte battery, for example, the electrode may include a negative electrode current collector as a current collector and include a negative electrode layer (negative electrode mixed-materials layer) as an electrode layer (electrode mixed-materials layer). The negative electrode layer includes a negative electrode active material described later, for example, as an active material.

When the electrode according to the embodiment is used as a positive electrode of a nonaqueous electrolyte battery, for example, the electrode may include a positive electrode current collector as a current collector and include a positive electrode layer (positive electrode mixed-materials layer) as an electrode layer (electrode mixed-materials layer). The positive electrode layer includes a positive electrode active material described later, for example, as an active material.

Hereinafter, regarding the electrode according to the embodiment, the aspect as a negative electrode and the aspect of a positive electrode will be described in detail.

(Negative Electrode)

The negative electrode may include a negative electrode current collector and a negative electrode layer. The negative electrode layer may be formed on one surface or both of reverse surfaces of the negative electrode current collector. The negative electrode layer may include a negative electrode active material, and optionally a conductive agent and a binder. The negative electrode active material includes an oxide including titanium. In addition, the negative electrode layer may include lithium fluoride.

Examples of titanium-containing oxide included in a negative electrode active material may include spinel type lithium titanate (for example, $Li_4Ti_5O_{12}$), monoclinic β type titanium oxide ($TiO_2(B)$), $Ti_{1-x}M1_xNb_{2-y}M2_yO_{7-\delta}$ ($0 \le x < 1$, $0 \le y < 1$, $-0.5 \le \delta \le 0.5$, M1 and M2 are each at least one element selected from the group consisting of Mg, Fe, Ni, Co, W, Ta, and Mo, and the elements M1 and M2 may be the same or different from each other), and orthorhombic type Na-containing niobium titanium composite oxide represented by $Li_{2+v}Na_{2-w}M1_xTi_{6-y-z}Nb_yM2_zO_{14+\delta}$ ($0 \le v \le 4$, $0 \le w < 2$, $0 \le x < 2$, $0 < y < 6$, $0 \le z < 3$, $y + z < 6$, $-0.5 \le \delta \le 0.5$, M1 is at least one element selected from the group consisting of Cs, K, Sr, Ba, and Ca, and M2 is at least one element selected from the group consisting of Zr, Sn, V, Ta, Mo, W, Fe, Co, Mn, and Al). The negative electrode active material may include one of these titanium-containing oxides or a combination of two or more thereof.

The conductive agent is added to improve a current collection performance and to suppress the contact resistance between the negative electrode active material and the current collector. Examples of the conductive agent include carbonaceous substances such as vapor grown carbon fiber (VGCF), acetylene black, carbon black, and graphite. One of these may be included as the conductive agent, or two or more may be included in combination as the conductive agent. Furthermore, carbon coating or electron conducting inorganic material coating may be applied to the particle surface, in advance.

The binder is added to fill gaps among the dispersed negative electrode active material and also to bind the negative electrode active material with the current collector. Examples of the binder include polytetrafluoroethylene (PTFE), polyvinylidene fluoride (PVdF), fluorine rubber, styrene-butadiene rubber, polyacrylic acid compounds, and imide compounds. One of these may be included as the binder, or two or more may be included in combination as the binder.

The active material, conductive agent and binder in the negative electrode layer are preferably blended in proportions of 70% by mass to 96% by mass, 2% by mass to 28% by mass, and 2% by mass to 28% by mass, respectively. When the amount of conductive agent is 2% by mass or more, the current collection performance of the negative electrode layer can be improved. When the amount of binder is 2% by mass or more, binding between the negative electrode layer and current collector becomes sufficient, and excellent cycling performances can be expected. On the other hand, an amount of each of the conductive agent and binder is preferably 28% by mass or less, in view of increasing the capacity.

Used as the negative electrode current collector is a material which is electrochemically stable within a potential range that is higher (more noble) than 1.0 V (vs. $Li/Li^+$) relative to the oxidation-reduction potential of lithium. More specifically, the negative electrode current collector is preferably made of aluminum or an aluminum alloy including one or more elements selected from the group consisting of Mg, Ti, Zn, Mn, Fe, Cu, and Si. The negative electrode current collector is preferably a foil made of these materials, i.e., an aluminum foil or an aluminum alloy foil. The thickness of the current collector is preferably from 5 μm to 20 μm. The negative electrode current collector having such a thickness can maintain balance between the strength and weight reduction of the negative electrode.

The negative electrode as one aspect of the electrode according to the embodiment includes lithium fluoride in the negative electrode layer. Within the negative electrode layer, the amount of lithium fluoride included is 0.02% by weight or more and less than 2% by weight based on the weight of the negative electrode layer, in a thickness region from a surface on a negative electrode current collector side to a distance (span) equal to 20% with respect to the thickness of the negative electrode layer. The amount of lithium fluoride included is from 2% by weight to 10% by weight based on the weight of the negative electrode layer, in a thickness region from a surface located opposite the surface on the negative electrode current collector side to a distance (span)

equal to 20% with respect to the thickness of the negative electrode layer, within the negative electrode layer.

As described above, lithium fluoride included in the negative electrode layer has a gradient in which the content decreases toward an internal direction from near the surface layer of the negative electrode to near a current collector. According to this constitution, a low resistance negative electrode can be obtained while decomposition of a nonaqueous electrolyte at the negative electrode can be effectively suppressed.

(Positive Electrode)

The positive electrode may include a positive electrode current collector and a positive electrode layer. The positive electrode layer may be formed on one surface or both of reverse surfaces of the current collector. The positive electrode layer may include a positive electrode active material, and optionally a conductive agent and a binder.

As the positive electrode active material, for example, an oxide or a sulfide may be used. The positive electrode may include one kind of positive electrode active material, or alternatively, include two or more kinds of positive electrode active materials. Examples of the oxide and sulfide include a compound capable of having Li inserted and extracted. Specific examples thereof include manganese dioxide ($MnO_2$), iron oxide, copper oxide, nickel oxide, lithium manganese composite oxide having a spinel structure (e.g., $Li_xMn_2O_4$ or $Li_xMnO_2$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese cobalt composite oxide (e.g., $Li_xMn_yCo_{1-y}O_2$), lithium manganese nickel composite oxide having a spinel structure (e.g., $Li_xMn_{2-y}Ni_yO_4$), lithium phosphorus oxide having an olivine structure (e.g., $Li_xFePO_4$, $Li_xFe_{1-y}Mn_yPO_4$, and $Li_xCoPO_4$), iron sulfate ($Fe_2(SO_4)_3$), vanadium oxide (e.g., $V_2O_5$), and lithium nickel cobalt manganese composite oxide. In the above-described formulas, $0<x\leq1$, and $0<y\leq1$. In addition to the above compounds, examples of active materials that may be included in the positive electrode include $LiMn_{1-x-y}Fe_xA_yPO_4$ ($0\leq x\leq1$, $0\leq y\leq0.1$, A=at least one element selected from the group consisting of Mg, Ca, Al, Ti, Zn, and Zr) and a ternary composite oxide $LiNi_xMn_yCo_{1-x-y}O_2$ ($0.3\leq x\leq0.8$, $0.1\leq y\leq0.4$). As the active material, one of these compounds may be used singly, or plural compounds may be used in combination.

More preferable examples of the active material include $LiMn_{1-x-y}Fe_xA_yPO_4$ ($0\leq x\leq1$, $0\leq y\leq0.1$, A=at least one element selected from the group consisting of Mg, Ca, Al, Ti, Zn, and Zr), ternary composite oxide $LiNi_xMn_yCo_{1-x-y}O_2$ ($0.3\leq x\leq0.8$, $0.1\leq y\leq0.4$), spinel structure manganese oxide $LiMn_2O_4$, layered structure compound $LiMO_2$ (M is at least one element selected from the group consisting of Ni Co, and Mn).

When an ordinary temperature molten salt is used as the nonaqueous electrolyte of the battery, preferred examples of the positive electrode active material include lithium iron phosphate, $Li_xVPO_4F$ ($0\leq x\leq1$), lithium manganese composite oxide, lithium nickel composite oxide, and lithium nickel cobalt composite oxide. Since these compounds have low reactivity with ordinary temperature molten salts, cycle life can be improved.

The primary particle size of the positive electrode active material is preferably from 100 nm to 1 μm. The positive electrode active material having a primary particle size of 100 nm or more is easy to handle during industrial production. In the positive electrode active material having a primary particle size of 1 μm or less, diffusion of lithium ions within solid can proceed smoothly.

The specific surface area of the positive electrode active material is preferably 0.1 $m^2$/g to 10 $m^2$/g. The positive electrode active material having a specific surface area of 0.1 $m^2$/g or more can secure sufficient sites for inserting and extracting Li ions. The positive electrode active material having a specific surface area of 10 $m^2$/g or less is easy to handle during industrial production, and can secure a good charge and discharge cycle performance.

The conductive agent is added as necessary, in order to improve the current collection performance, and at the same time, suppress the contact resistance between the positive electrode active material and current collector. Examples of the conductive agent include carbonaceous substances such as acetylene black, carbon black, graphite, carbon nanofiber, and carbon nanotube. One of these carbonaceous substances may be included as the conductive agent, or two or more carbonaceous substances may be included in combination as the conductive agent.

The binder is added to bind the positive electrode active material, the current collector, and the conductive agent (when included). Examples of the binder include polytetrafluoroethylene (PTFE), polyvinylidene fluoride (PVdF), fluorine rubber, polyacrylic resin, and cellulose such as carboxymethylcellulose. One of these may be included as the binder, or two or more may be included in combination as the binder.

In the positive electrode layer, the positive electrode active material, conductive agent, and binder are preferably included in proportions of from 80% by mass to 95% by mass, from 3% by mass to 18% by mass, and from 2% by mass to 17% by mass, respectively. When the amount of the conductive agent is 3% by mass or more, an effect of securing conductivity can be expressed. By setting the amount of the positive electrode conductive agent to 18% by mass or less, the decomposition of a nonaqueous electrolyte on the surface of the positive electrode conductive agent during high-temperature storage can be reduced. When the amount of the binder is 2% by mass or more, sufficient electrode strength can be achieved. When the amount of the binder is 17% by mass or less, the amount of the insulator in the electrode can be reduced, and thereby the internal resistance can be decreased.

The positive electrode current collector is preferably made of aluminum, or an aluminum alloy including one or more elements selected from the group consisting of Mg, Ti, Zn, Ni, Cr, Mn, Fe, Cu, and Si. The positive electrode current collector is preferably a foil made of these materials, i.e., an aluminum foil or an aluminum alloy foil. In addition, in consideration of the expansion and contraction of the positive electrode active material that accompany charge-and-discharge, the positive electrode current collector is desirably a foil processed to have a rough surface.

The thickness of the aluminum foil or aluminum alloy foil is preferably from 5 μm to 20 μm, and more preferably 15 μm or less. The purity of the aluminum foil is preferably 99% by mass or more. The amount of the transition metal such as iron, copper, nickel, or chromium included in the aluminum foil or aluminum alloy foil is preferably 1% by mass or less.

The positive electrode as one aspect of the electrode according to the embodiment includes lithium fluoride in a positive electrode layer. Within the positive electrode layer, the amount of lithium fluoride included is 0.02% by weight or more and less than 2% by weight based on the weight of the positive electrode layer, in a thickness region from a surface on a positive electrode current collector side to a distance (span) equal to 20% with respect to the thickness of the positive electrode layer. The amount of lithium fluoride included is from 2% by weight to 10% by weight based on the weight of the positive electrode layer, in a thickness region from a surface located opposite the surface on the positive electrode current collector side to a distance (span) equal to 20% with respect to the thickness of the positive electrode layer, within the positive electrode layer.

As described above, lithium fluoride included in the positive electrode layer has a gradient in which the content decreases toward an internal direction from near the surface layer of the positive electrode to near a current collector. According to this constitution, a low resistance positive electrode can be obtained while decomposition of a nonaqueous electrolyte at the positive electrode can be effectively suppressed.

<Method of Producing Electrode>

The electrode according to the first embodiment can be produced as follows, for example. First, an active material, a binder, lithium fluoride as an additive, and, if necessary, a conductive agent are suspended in a suitable solvent, for example a solvent widely used in production of an electrode, to prepare a slurry. When a negative electrode is produced, for example, a negative electrode active material, a binder, a conductive agent, and lithium fluoride as an additive are suspended in a generally used solvent to prepare a negative electrode slurry. When a positive electrode is produced, for example, a positive electrode active material, a binder, lithium fluoride as an additive, and a conductive agent mixed as necessary are suspended in a suitable solvent to prepare a positive electrode slurry.

Next, the prepared slurry is coated onto a current collector, and the coating is dried to form an electrode layer. When the negative electrode is produced, the negative electrode slurry is coated onto a negative electrode current collector, and the coating is dried to form a negative electrode layer. Similarly, when the positive electrode is produced, the positive electrode slurry is coated onto a positive electrode current collector, and the coating is dried to form a positive electrode layer.

Then, the current collector and the electrode layer thereon are pressed, whereby an electrode can be produced. The negative electrode can be produced by pressing the negative electrode current collector and the negative electrode layer thereon, and the positive electrode can be produced by pressing the positive electrode current collector and the positive electrode layer thereon.

Alternatively, an active material, a binder, a conductive agent, and lithium fluoride as an additive are formed into pellets, whereby an electrode layer can be provided. Specifically, a negative electrode active material, a binder, a conductive agent, and lithium fluoride as an additive are formed into pellets, whereby the pelletized product can be used as a negative electrode layer. Similarly, a positive electrode active material, a binder, lithium fluoride as an additive, and a conductive agent mixed as necessary are formed into pellets, whereby the pelletized product can be used as a positive electrode layer. The electrode may be produced by disposing the pelletized electrode layer on the current collector.

As described above, in the case of producing either of the negative electrode and the positive electrode, the electrode of the embodiment can be produced by mixing lithium fluoride during preparation of the slurry. Here, a particle size of lithium fluoride is preferably from 50 nm to 1 μm. By virtue of the use of lithium fluoride having a particle size in this range, when an electrode layer is formed by drying a slurry in order to produce an electrode different in lithium fluoride concentration in a thickness direction of the electrode layer, a phenomenon causing a bias in distribution of lithium fluoride can be used. As a specific example of a production method using such a phenomenon, a slurry is coated onto a current collector such that the mixing amount of lithium fluoride is 2% by weight to 15% by weight when the slurry is prepared, for example. When the electrode coated with the slurry, that is, the current collector and the slurry coated thereon are dried, the drying temperature is set to 150° C. or more, and hot air is intensively blown onto an electrode surface (a surface of a coating of the slurry). According to this procedure, drying from the electrode surface can be accelerated, so that convection is generated in the coating of the slurry. Thus, distribution of lithium fluoride in the electrode layer after drying can be biased, and specifically distribution of lithium fluoride can be shifted such that the concentration (content) on the electrode surface side becomes higher. When the drying temperature of the slurry is approximately 100° C. to 130° C., which is a general temperature condition, the distribution of lithium fluoride may not be satisfactorily biased.

As another production method, two or more slurries different in content of lithium fluoride are coated in two or more separate stages. As a specific example, a slurry in which the content of lithium fluoride is 2% by weight or less is first coated onto a current collector to obtain a coating as a first layer. Then, a slurry in which the content of lithium fluoride is approximately 5% by weight to 10% by weight is coated onto the first layer to obtain a coating as a second layer. The coating as the second layer may be coated after or before the first layer is dried. Although the coating of the slurry is coated in two separate layers in this example, the slurry may be coated in three or more separate layers.

When an active material, a binder, a conductive agent, and lithium fluoride are formed into pellets to provide an electrode layer, pellets different in content of lithium fluoride can be sequentially arranged on a current collector. As a specific example, when pellets in which the content of lithium fluoride is 2% by weight or less is disposed on a current collector, a layer of the pellets disposed as a first layer can be obtained. Then, when pellets in which the content of lithium fluoride is approximately 5% by weight to 10% by weight is disposed on the first layer, a layer of the pellets disposed as a second layer can be obtained. Although two pellet layers are separately disposed on the current collector in this example, three or more pellet layers may be separately arranged.

<Method of Examining Lithium Fluoride in Electrode>

Next, a quantitative analysis method for lithium fluoride in the electrode according to the first embodiment will be described. Quantitative analysis is applied to a nonaqueous electrolyte battery whose capacity is maintained to 95% or more of the rating capacity. In a battery where degradation has progressed and is significantly reduced in capacity as compared with the rating capacity, lithium fluoride distribution in an electrode may significantly change from the time of manufacturing due to the influence of a SEI (Solid-Electrolyte Interphase) component formed on a surface of an electrode layer or an active material surface.

(Sampling of Electrode Mixed-Materials Layer)

When distribution of lithium fluoride in a thickness direction of an electrode is measured, first, of an electrode mixed-materials layer, a 20% thickness region from a surface layer of the electrode layer and a 20% thickness region from an interface between the electrode layer and a current collector foil are extracted using a cutting-and-strength measurement apparatus such as SAICAS (registered trademark) (Surface And Interfacial Cutting Analysis System). For example, a nonaqueous electrolyte battery is discharged, and the battery whose SOC (state of charge) is 0% is decomposed under inert atmosphere. Then, an electrode to be measured is taken out. The taken-out electrode is cleaned with dimethyl carbonate for 30 minutes and vacuum dried for 30 minutes. The obtained electrode is subjected to sampling with the use of cutting according to a SAICAS method.

As a measurement apparatus, DN-GS manufactured by Daipla Wintes Co., Ltd. may be used, for example. A ceramic blade having a blade width of 1.0 mm and formed of a borazon material is used as a cutting blade. As the blade angles, a rake angle is 20 degrees, and a clearance angle is 10 degrees. In the measurement of the cutting strength, first, cutting is performed at a constant rate, including a horizontal rate of 2 μm/sec and a vertical rate of 0.2 μm/sec, and at a shear angle of 45 degrees to move the blade to a predetermined depth in the electrode mixed-materials layer. After that, cutting in the vertical direction is stopped, and cutting is continued in a constant rate mode at a horizontal rate of 2 μm/sec. After cutting in the vertical direction is performed to a depth in a thickness direction corresponding to a region to be measured in the electrode mixed-materials layer, a portion of the electrode mixed-materials layer corresponding to a thickness region to be measured can be cut out by cutting in the horizontal direction.

Another region in a depth direction (thickness direction) of the electrode mixed-materials layer can be sampled by changing a depth where the blade is moved into the electrode mixed-materials layer. For example, the surface layer of the electrode mixed-materials layer (when the electrode layer is provided on only one side of the current collector, the surface layer of the electrode mixed-materials layer is a surface opposite to the current collector side) is first cut in the vertical direction, and the blade is brought to a predetermined position at a depth of 20% with respect to the thickness of the electrode mixed-materials layer from the surface layer of the electrode mixed-materials layer. Whereupon, cutting in the vertical direction is stopped, and cutting in the horizontal direction is continued, whereby the electrode mixed-materials layer in the 20% thickness region from the surface layer can be sampled.

Subsequently, for example, the blade is brought to a predetermined position at a depth of 80% or more with respect to the thickness of the electrode mixed-materials layer from the surface layer of the electrode mixed-materials layer. Whereupon, cutting in the vertical direction is stopped, and cutting in the horizontal direction is continued, whereby the electrode mixed-materials layer in the 20% thickness region from an interface with the current collector can be sampled. At this time, the electrode mixed-materials layer (the 20% thickness region from the interface) may be peeled from the current collector by cutting in the horizontal direction. The electrode mixed-materials layer peeled from the current collector relative to the interface as a boundary can be collected as a sample.

As described above, when cutting is repeated for each position in the depth direction (thickness direction) in the electrode mixed-materials layer in a region to be measured, the electrode mixed-materials layer can be sampled for each thickness direction. In the above example, although the 20% thickness region near the surface layer of the electrode mixed-materials layer and the 20% thickness region near the interface between the electrode mixed-materials layer and the current collector are sampled, by suitably adjusting the position where cutting in the vertical direction is stopped, the electrode mixed-materials layer in any region in the thickness direction can be sampled.

Before sampling according to cutting using the SAICAS method, for example, thickness measurement is applied to the electrode to examine the thickness of the electrode mixed-materials layer, and the depth of sampling in each region can be specified. As an apparatus used for measurement, an ion milling apparatus IM4000 manufactured by Hitachi High-Technologies Corporation is used, for example. The electrode is processed to expose a cross-section, and an obtained sample is observed with, for example, an SEM (Scanning Electron Microscope) TM3030 manufactured by Hitachi High-Technologies Corporation, whereby a thickness of a mixed-materials layer can be quantified.

<Qualitative Analysis of Lithium Fluoride by XRD Analysis>

Qualitative analysis of lithium fluoride in an electrode can be performed by X-ray diffraction (XRD) analysis. For example, with the use of an XRD measuring apparatus such as a Bruker desktop X-ray diffractometer, model D2 Phaser, an electrode sampled by the above-described SAICAS method is pulverized, and a produced sample is measured. As the measurement conditions, a diffraction angle $2\theta$ is from 10 degrees to 80 degrees with respect to a Cu-K$\alpha$ ray source, a step width is 0.02 degrees, and an integration time is 0.5 seconds. Since a Li compound included in the sample can be identified based on a diffraction peak obtained from a measured diffraction spectrum, the presence of lithium fluoride can be examined.

<Quantitative Analysis of Lithium Fluoride by ICP>

Since lithium fluoride mixed in an electrode exhibits solubility in water, lithium fluoride can be extracted with water to be subjected to quantitative analysis. A sample of an electrode mixed-materials layer collected by the above-described SAICAS method is immersed in 10 ml of purified water for 30 minutes, for example, and then suctioned and filtrated using a membrane filter (formed of polytetrafluoroethylene and having a pore diameter of 0.1 μm). After that, the obtained extraction liquid (filtrate) is diluted to a determined amount and used as a measurement sample. Quantitative analysis of a Li compound is performed by an inductively coupled plasma (ICP) emission spectrometry with the use of this measurement sample. Specifically, for example, lithium fluoride can be quantified by examination of an abundance ratio of fluorine (F) in the extracted measurement sample. Although the binder capable of being included in an electrode layer include a binder containing fluorine, such as polyvinylidene-fluoride for example, since such a binder has significantly low solubility in water, it is not substantially included in a sample extracted with purified water as described above.

The electrode according to the first embodiment includes a current collector and an electrode layer disposed on the current collector and including lithium fluoride. A content of lithium fluoride based on a weight of the electrode layer is within a range of 0.02% by weight or more and less than 2% by weight in a 20% thickness region with respect to a thickness of the electrode layer. The 20% thickness region lies from an interface between the electrode layer and the current collector toward an inside of the electrode layer. Further, the content of lithium fluoride is in a range of from 2% by weight to 10% by weight in another 20% thickness region with respect to the thickness of the electrode layer. The other 20% thickness region lies from a surface of the electrode layer on the reverse side with respect to the interface between the electrode layer and the current collector toward the inside of the electrode layer. Since the electrode according to the embodiment is configured thus, the electrode can provide a nonaqueous electrolyte battery having high cycle performance under high temperature.

Second Embodiment

According to the second embodiment, a nonaqueous electrolyte battery is provided. The nonaqueous electrolyte battery includes a negative electrode, a positive electrode, and a nonaqueous electrolyte. At least one of the negative electrode and the positive electrode includes the electrode of the first embodiment.

The nonaqueous electrolyte battery according to the second embodiment may further include a separator disposed between the positive electrode and the negative electrode. The positive electrode, the negative electrode, and the separator can constitute an electrode group. The nonaqueous electrolyte may be held in the electrode group.

The nonaqueous electrolyte battery according to the second embodiment may further include a container member for housing the electrode group and a nonaqueous electrolyte.

The nonaqueous electrolyte battery according to the second embodiment may furthermore include a positive electrode terminal electrically connected to the positive electrode and a negative electrode terminal electrically connected to the negative electrode. At least a portion of the positive electrode terminal and at least a portion of the negative electrode terminal may extend outside the container member.

Hereinafter, the negative electrode, the positive electrode, the nonaqueous electrolyte, the separator, the container member, the positive electrode terminal, and the negative electrode terminal will be described in detail.

1) Negative Electrode and Positive Electrode

The aspect as the negative electrode and the aspect as the positive electrode of the electrode according to the first embodiment may be used respectively as the negative electrode and the positive electrode of the nonaqueous electrolyte battery. In the nonaqueous electrolyte battery, the negative electrode may be the aspect as the negative electrode of the electrode according to the first embodiment, the positive electrode may be the aspect as the positive electrode of the electrode according to the first embodiment, or both the negative electrode and the positive electrode may respectively be the aspect as the negative electrode and the aspect as the positive electrode according to the first embodiment. For example, when the negative electrode is the aspect as the negative electrode in the first embodiment, lithium fluoride may be omitted from the positive electrode. On the other hand, for example when the positive electrode is the aspect as the positive electrode in the first embodiment, lithium fluoride may be omitted from the negative electrode. The positive electrode and the negative electrode omitting lithium fluoride may respectively have configurations similar to the aspect as the positive electrode and the aspect as the negative electrode in the first embodiment, except that lithium fluoride is omitted, for example.

2) Nonaqueous Electrolyte

As the nonaqueous electrolyte, a liquid nonaqueous electrolyte or gel-like nonaqueous electrolyte may be used. The liquid nonaqueous electrolyte is prepared by dissolving an electrolyte in an organic solvent. The electrolyte concentration is preferably in the range of from 0.5 mol/L to 2.5 mol/L. The gel-like nonaqueous electrolyte is prepared by obtaining a composite of a liquid electrolyte and a polymer material.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bistrifluoromethylsulfonylimide [$LiN(CF_3SO_2)_2$], and mixtures thereof. The electrolyte is preferably resistant to oxidation even at a high potential, and most preferably $LiPF_6$.

Examples of the organic solvent include a cyclic carbonate such as propylene carbonate (PC), ethylene carbonate (EC), or vinylene carbonate (VC); a linear carbonate such as diethyl carbonate (DEC), dimethyl carbonate (DMC), or methyl ethyl carbonate (MEC); a cyclic ether such as tetrahydrofuran (THF), 2-methyl tetrahydrofuran (2-MeTHF), or dioxolane (DOX); a linear ether such as dimethoxy ethane (DME) or diethoxy ethane (DEE); γ-butyrolactone (GBL), acetonitrile (AN), and sulfolane (SL). These organic solvents may be used singularly or as a mixed solvent.

Examples of the polymeric material include polyvinylidene fluoride (PVdF), polyacrylonitrile (PAN), and polyethylene oxide (PEO).

Alternatively, the nonaqueous electrolyte may be, for example, an ordinary temperature molten salt (ionic melt) including lithium ions, a polymer solid electrolyte, or an inorganic solid electrolyte.

The ordinary temperature molten salt (ionic melt) means compounds among organic salts made of combinations of organic cations and anions, which are able to exist in a liquid state at ordinary temperature (15 to 25° C.). The ordinary temperature molten salt includes an ordinary temperature molten salt which exists alone as a liquid, an ordinary temperature molten salt which becomes a liquid upon mixing with an electrolyte, and an ordinary temperature molten salt which becomes a liquid when dissolved in an organic solvent. In general, the melting point of the ordinary temperature molten salt used in nonaqueous electrolyte batteries is 25° C. or below. The organic cations generally have a quaternary ammonium framework.

The polymer solid electrolyte is prepared by dissolving the electrolyte in a polymeric material, and solidifying it.

The inorganic solid electrolyte is a solid substance having Li ion conductivity.

3) Separator

The separator may be made of, for example, a porous film or synthetic resin nonwoven fabric including polyethylene, polypropylene, cellulose, or polyvinylidene fluoride (PVdF). Among these, a porous film formed from polyethylene or polypropylene melts at a fixed temperature and thus able to shut off a current, therefore the porous film can improve safety.

4) Container Member

As the container member, for example, a container (e.g., a bag-shaped container) made of a laminate film having a thickness of 0.5 mm or less, or a metal case having a wall thickness of 1 mm or less may be used. The thickness of the laminate film is more preferably 0.2 mm or less. The wall thickness of the metal case is more preferably 0.5 mm or less, and still more preferably 0.2 mm or less.

The shape of the container member is not particularly limited, and may be, for example, flat (thin), square, cylinder, coin, or button-shaped. The container member depends on the size of the battery, and may be that for a compact battery installed in mobile electronic devices, or a large battery installed in vehicles such as two- to four-wheel automobiles.

As the laminate film, used is a multilayer film including resin layers and a metal layer sandwiched between the resin layers. The metal layer is preferably an aluminum foil or an aluminum alloy foil, so as to reduce weight. The resin layer may be, for example, a polymeric material such as polypropylene (PP), polyethylene (PE), nylon, or polyethylene terephthalate (PET). The laminate film may be heat-sealed to be formed into the shape of a container member.

The metal case is made of aluminum or an aluminum alloy, for example. As the aluminum alloy, an alloy including one or more of an element such as magnesium, zinc, or silicon is preferable. If a transition metal such as iron, copper, nickel, or chromium is included in the alloy, the included amount thereof is preferably set to 1% by mass or less.

5) Negative Electrode Terminal and Positive Electrode Terminal

The negative electrode terminal may be made of, for example, a material that is electrically stable within the potential range of from 1.0 V to 3.0 V (vs. Li/Li$^+$) relative to the oxidation-and-reduction potential of lithium, and has electrical conductivity. The negative electrode terminal is preferably made of aluminum or an aluminum alloy including one or more selected from the group consisting of Mg, Ti, Zn, Mn, Fe, Cu, Si, or the like. The negative electrode terminal is preferably made of the same material as the negative electrode current collector in order to reduce contact resistance with the negative electrode current collector.

The positive electrode terminal may be made of, for example, a material that is electrically stable within the potential range of from 3.0 V to 4.5 V (vs. Li/Li$^+$) relative to the oxidation-and-reduction potential of lithium, and has electrical conductivity. The positive electrode terminal is preferably made of aluminum or an aluminum alloy including one or more selected from the group consisting of Mg, Ti, Zn, Mn, Fe, Cu, Si, or the like. The positive electrode terminal is preferably made of the same material as the positive electrode current collector in order to reduce contact resistance with the positive electrode current collector.

Next, the nonaqueous electrolyte battery according to the second embodiment will be more specifically described with reference to the drawings.

First, an example of the nonaqueous electrolyte battery according to the second embodiment will be described with reference to FIGS. 1 and 2.

FIG. 1 is a cross-sectional view of an example of a nonaqueous electrolyte battery according to the second embodiment. FIG. 2 is an enlarged cross-sectional view showing a portion A in FIG. 1.

A nonaqueous electrolyte battery 10 shown in FIGS. 1 and 2 includes a bag-shaped container member 2 shown in FIG. 1, an electrode group 1 shown in FIGS. 1 and 2, and a nonaqueous electrolyte (not shown). The electrode group 1 and the nonaqueous electrolyte are housed in the container member 2. The nonaqueous electrolyte is held in the electrode group 1.

The bag shaped container member 2 is made of a laminate film including two resin layers and a metal layer sandwiched between the resin layers.

As shown in FIG. 1, the electrode group 1 is a wound electrode group in a flat form. The wound electrode group 1 in a flat form includes a negative electrode 3, a separator 4, and a positive electrode 5, as shown in FIG. 2. The separator 4 is sandwiched in between the negative electrode 3 and the positive electrode 5.

The negative electrode 3 includes a negative electrode current collector 3a and a negative electrode layer 3b. The negative electrode 3 may be the aspect as a negative electrode of the electrode according to the first embodiment. Of the negative electrode 3, in a part located in the outermost shell of the wound electrode group 1, the negative electrode layer 3b is formed on the negative electrode current collector 3a, only on the surface facing the center of the electrode group, as shown in FIG. 2. In the other parts of the negative electrode 3, the negative electrode layer 3b is formed on both of reverse surfaces of the negative electrode current collector 3a.

The positive electrode 5 includes a positive electrode current collector 5a and positive electrode layers 5b formed on both of reverse surfaces of the positive electrode current collector 5a. The positive electrode 5 may be the aspect as a positive electrode of the electrode according to the first embodiment.

As shown in FIG. 1, in the vicinity of the outer peripheral edge of the wound electrode group 1, a negative electrode terminal 6 is connected to the negative electrode current collector 3a positioned in the outermost part of negative electrode 3, and a positive electrode terminal 7 is connected to the positive electrode current collector 5a in the positive electrode 5 on the inner side. The negative electrode terminal 6 and the positive electrode terminal 7 are extended out from the opening of the bag shaped container member 2.

The nonaqueous electrolyte battery 10 shown in FIGS. 1 and 2 can be produced according to the following procedure, for example. First, an electrode group 1 is produced. The wound electrode group 1 in a flat form as described can be formed by, for example, stacking a negative electrode 3, a separator 4, a positive electrode 5, and another separator 4, such that the separators 4 are sandwiched between the negative electrode 3 and the positive electrode 5, to obtain a stack, then spirally winding the stack in a manner so that a part of the negative electrode 3 would be positioned on the outside as shown in FIG. 2, and then press-forming the wound stack. The electrode group 1 is then enclosed in a bag-shaped container member 2. Upon which, one end of each the negative electrode terminal 6 and positive electrode terminal 7 are made to protrude outside the container member 2. Next, the circumference of the container member 2 is heat-sealed with a portion left unsealed. Next, treating a portion that had not been heat-sealed as an opening of the bag shaped container member 2, for example, a liquid nonaqueous electrolyte is poured in via this opening. Finally, the opening is heat-sealed, and thereby the wound electrode group 1 and the liquid nonaqueous electrolyte are completely sealed.

Figure 3:
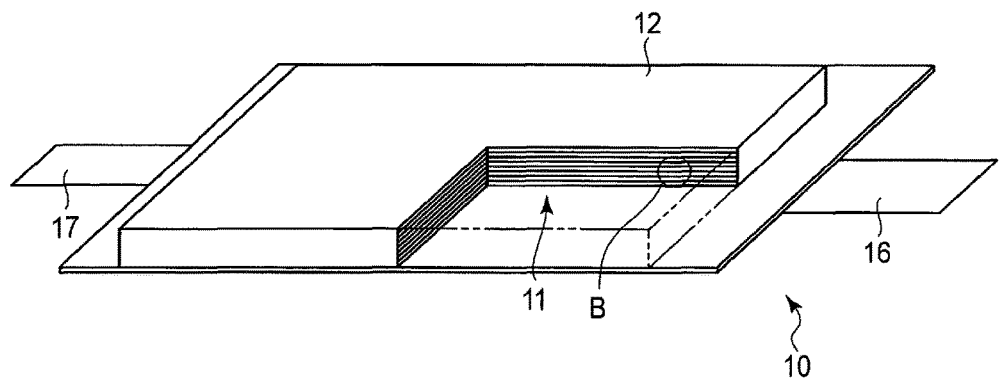
FIG. 3 is a partially cut-out perspective view schematically showing another example of a nonaqueous electrolyte battery according to the second embodiment.
Figure 4:
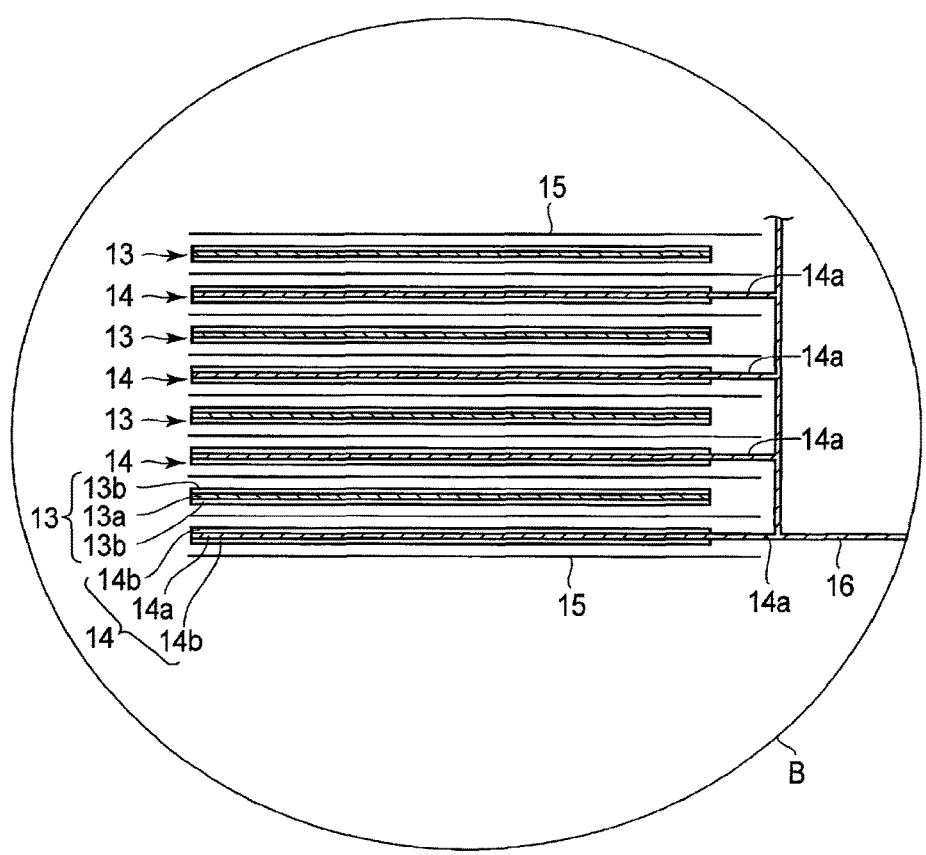
FIG. 4 is an enlarged cross-sectional view showing a portion B in FIG. 3.

The nonaqueous electrolyte battery according to the second embodiment is not limited to the example nonaqueous electrolyte secondary battery shown above in FIGS. 1 and 2, and may be, for example, a battery configured as shown in FIGS. 3 and 4.

FIG. 3 is a partially cut-out perspective view schematically showing another example of a nonaqueous electrolyte battery according to the second embodiment. FIG. 4 is an enlarged cross-sectional view showing section B in FIG. 3.

A nonaqueous electrolyte battery 10 shown in FIGS. 3 and 4 includes an electrode group 11 shown in FIGS. 3 and 4, a container member 12 shown in FIG. 3, and a nonaqueous electrolyte (not shown). The electrode group 11 and the nonaqueous electrolyte are housed in the container member 12. The nonaqueous electrolyte is held in the electrode group 11.

The container member 12 is made of a laminate film including two resin layers and a metal layer sandwiched between the resin layers.

As shown in FIG. 4, the electrode group 11 is a stacked electrode group. As shown in FIG. 4, the stacked electrode group 11 has a structure in which positive electrodes 13 and negative electrodes 14 are alternately stacked with a separator 15 sandwiched therebetween.

The electrode group 11 includes plural positive electrodes 13. Each of the plural positive electrodes 13 includes a positive electrode current collector 13a, and positive electrode layers 13b supported on both of reverse surfaces of the positive electrode current collector 13a. The electrode group 11 includes plural negative electrodes 14. Each of the plural negative electrodes 14 includes a negative electrode current collector 14a, and negative electrode layers 14b supported on both of reverse surfaces of the negative electrode current collector 14a. An end of the negative electrode current collector 14a of each of the negative electrodes 14 protrudes out from the negative electrode 14. The protruded negative electrode current collector 14a is electrically connected to a strip-shaped negative electrode terminal 16. The tip of the strip-shaped negative electrode terminal 16 is extended out from the container member 12. Although not shown in the drawings, an end of the positive electrode current collector 13a of the positive electrodes 13 protrude from the positive electrodes 13 at the side opposed to the protruded end of the negative electrode current collector 14a. The positive electrode current collector 13a protruding from the positive electrode 13 is electrically connected to a strip-shaped positive electrode terminal 17. The tip of the strip-shaped positive electrode terminal 17 is positioned on the opposite side from the negative electrode terminal 16, and extended out from a side of the container member 12.

The nonaqueous electrolyte battery according to the second embodiment includes the electrode according to the first embodiment. Thus, the nonaqueous electrolyte battery according to the second embodiment can exhibit marked life performance under high temperature.

Third Embodiment

According to a third embodiment, a battery pack is provided. The battery pack includes the nonaqueous electrolyte battery according to the second embodiment.

The battery pack according to the third embodiment may include one or more nonaqueous electrolyte batteries (unit cells) according to the second embodiment described above. The plural nonaqueous electrolyte batteries, which may be included in the battery pack according to the third embodiment, may be electrically connected in series, in parallel, or in a combination of in a series and in parallel. The plural nonaqueous electrolyte batteries may be electrically connected in series or in parallel, to structure a battery module. The battery pack according to the third embodiment may include plural battery modules.

The battery pack according to the third embodiment may further include a protective circuit. The protective circuit has a function to control charging and discharging of the nonaqueous electrolyte battery. Alternatively, a circuit included in equipment where the battery pack serves as a power source (for example, electronic devices, vehicles, and the like) may be used as the protective circuit for the battery pack.

Moreover, the battery pack according to the third embodiment may further comprise an external power distribution terminal. The external power distribution terminal is configured to externally output current from the nonaqueous electrolyte battery, and to input current to the nonaqueous electrolyte battery. In other words, when the battery pack is used as a power source, the current is externally provided via the external power distribution terminal. When the battery pack is charged, the charging current (including regenerative energy caused by power of vehicles such as automobiles) is provided to the battery pack via the external power distribution terminal.

Next, an example of a battery pack according to the third embodiment will be described with reference to the drawings.

Figure 5:
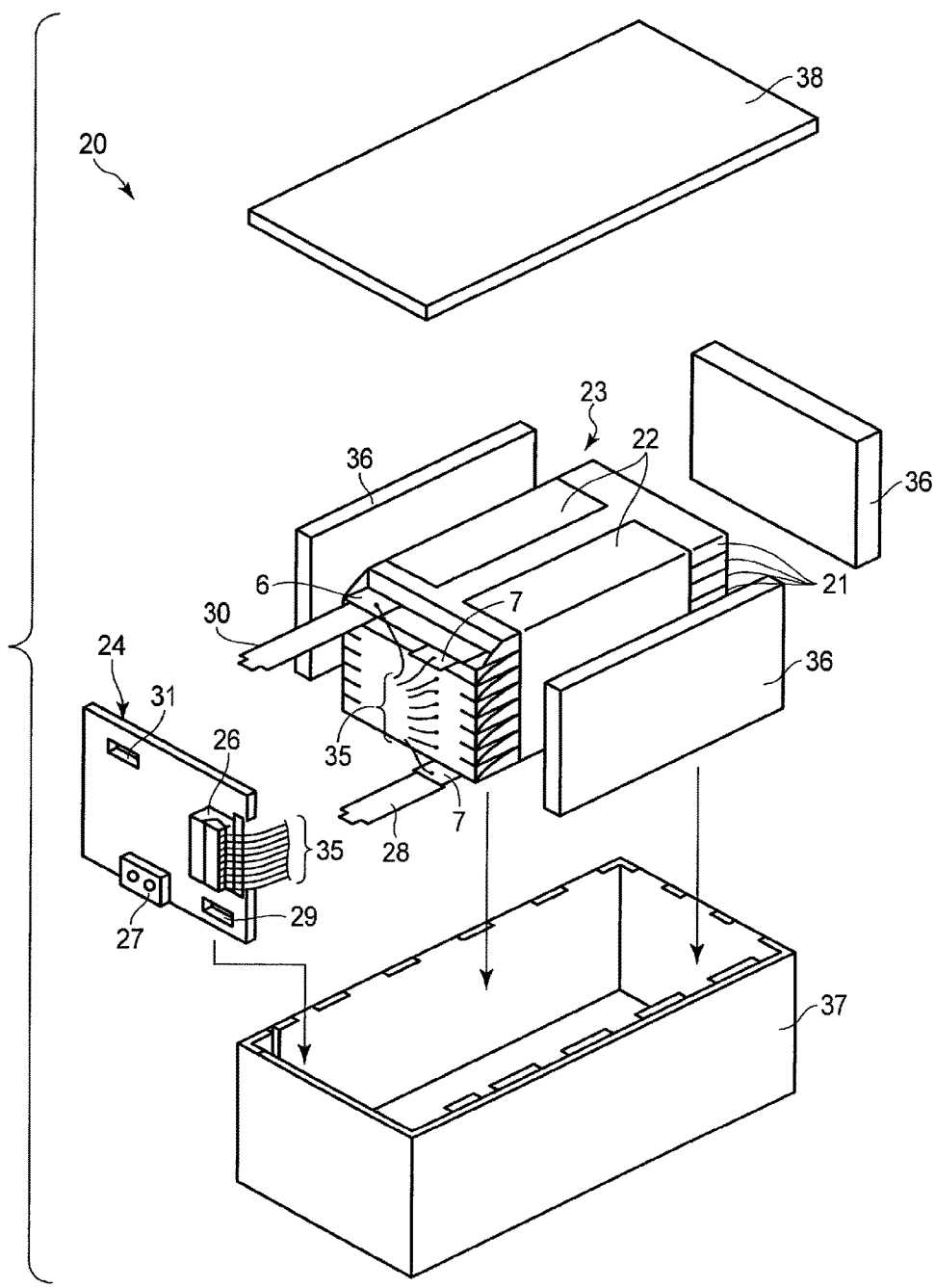
FIG. 5 is an exploded perspective view of an example of the battery pack according to a third embodiment.

FIG. 5 is an exploded perspective view of an example of the battery pack according to the third embodiment. FIG. 6 is a block diagram showing an electric circuit of the battery pack of FIG. 5.

A battery pack 20 shown in FIGS. 5 and 6 includes plural unit cells 21. The plural unit cells 21 are flat nonaqueous electrolyte batteries 10 described with reference to FIGS. 1 and 2.

Plural unit cells 21 are stacked so that the negative electrode terminals 6 and the positive electrode terminals 7 extended outside are arranged in the same direction, and fastened with an adhesive tape 22 to configure a battery module 23. The unit cells 21 are electrically connected to each other in series as shown in FIG. 6.

A printed wiring board 24 is disposed facing toward the side plane of the battery module 23 where the negative electrode terminal 6 and the positive electrode terminal 7 extend out from. A thermistor 25, a protective circuit 26, and an external power distribution terminal 27 are mounted on the printed wiring board 24 as shown in FIG. 6. An electric insulating plate (not shown) is attached to the surface of the printed wiring board 24 facing the battery module 23 to avoid unnecessary connection of the wires of the battery module 23.

A positive electrode-side lead 28 is connected to the positive electrode terminal 7 located at the bottom layer of the battery module 23 and the distal end of the lead 28 is inserted into a positive electrode-side connector 29 of the printed wiring board 24 so as to be electrically connected. A negative electrode-side lead 30 is connected to the negative electrode terminal 6 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wires 32 and 33 formed on the printed wiring board 24.

The thermistor 25 detects the temperature of the unit cells 21, and the detection signal is sent to the protective circuit 26. The protective circuit 26 can shut down a plus-side wire 34a and a minus-side wire 34b between the protective circuit 26 and the external power distribution terminal 27, under a predetermined condition. The predetermined condition indicates, for example, the case where the temperature detected by the thermistor 25 becomes a predetermined temperature or more. Another example of the predetermined condition is when over-charge, over-discharge, or over-current of the unit cells 21 is detected. The detection of the over-charge and the like is performed on each of the unit cells 21 or the entire battery module 23. When each of the unit cells 21 is detected, the cell voltage may be detected, or positive electrode or negative electrode potential may be detected. In the latter case, a lithium electrode to be used as a reference electrode is inserted into each of the unit cells 21. In the case of the battery pack 20 of FIGS. 5 and 6, wires 35 for voltage detection are connected to each of the unit cells 21. Detection signals are sent to the protective circuit 26 through the wires 35.

Protective sheets 36 made of rubber or resin are arranged on three side planes of the battery module 23 except the side plane from which the positive electrode terminal 7 and the negative electrode terminal 6 protrude out.

The battery module 23 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the internal surface on the opposite side in a short side direction. The battery module 23 is located in a space surrounded by the protective sheets 36 and the printed wiring board 24. A lid 38 is attached to the upper surface of the housing container 37.

In order to fix the battery module 23, a heat-shrinkable tape may be used instead of the adhesive tape 22. In such a case, the battery module is fastened by placing the protective sheets on both side surfaces of the battery module, revolving the heat-shrinkable tape around the battery module, and thermally shrinking the heat-shrinkable tape.

In FIGS. 5 and 6, an embodiment has been shown where plural unit cells 21 are connected in series; however, the connection may be made in parallel in order to increase battery capacity. Alternatively, connection in series may be combined with connection in parallel. Assembled battery packs may be connected further in series and/or in parallel.

Furthermore, although the battery pack shown in FIGS. 5 and 6 include plural unit cells 21, the battery pack according to the third embodiment may include only one unit cell 21.

The aspect of the battery pack according to the third embodiment may be appropriately changed depending on its application. The battery pack according to the third embodiment can be suitably used in applications in which cycle performance is demanded to be excellent when large current is taken out. Specifically the battery pack is used as a power source of a digital camera, as a battery for installing in a vehicle such as, for example, a two- to four-wheeled hybrid electric automobile, a two- to four-wheeled electric automobile, a power-assisted bicycle, or a railway car, or as a stationary battery. In particular, the battery pack is suitably used for a battery installed in a vehicle.

In a vehicle, such as an automobile and the like, that includes the battery pack according to the third embodiment, the battery pack is configured, for example, to recover regenerative energy caused by power of the vehicle. Examples of the vehicle include two to four-wheeled hybrid electric automobiles, two to four-wheeled electric automobiles, electric assist bicycles, and railway cars like electric trains.

FIG. 7 shows an example of an automobile that includes a battery pack according to the third embodiment.

The automobile 41 shown in FIG. 7 includes a battery pack 42, which is an example of the battery pack according to the third embodiment, installed in its engine compartment. There is concern that the interior temperature of the engine compartment may become high. Since the battery pack according to the third embodiment includes the non-aqueous electrolyte battery having excellent durability at high temperature, the battery pack can be used favorably, even when disposed in the engine compartment of an automobile, as shown in FIG. 7.

The position for installing the battery pack in an automobile is not limited to engine compartments. For example, the battery pack may also be installed in rear parts of automobiles (e.g., underneath the floor, on the rear side of seat backs, in lower portions in the trunk compartment) or under seats.

The battery pack according to the third embodiment includes the nonaqueous electrolyte battery according to the second embodiment. Thus, the battery pack according to the third embodiment can exhibit marked life performance at high temperature.

EXAMPLES

Hereinafter, Examples will be described, but the present disclosure is not limited to the examples described below, so long as the disclosure does not depart from the spirit of the embodiments.

Example 1

<Production of Electrode>

First, a positive electrode was produced as follows. 100% by weight of a $LiMn_{0.75}Fe_{0.20}Mg_{0.05}PO_4$ powder having an olivine structure as a positive electrode active material, 5% by weight of acetylene black as a conductive agent, 5% by weight of polyvinylidene-fluoride (PVdF) as a binder, and 5% by weight of lithium fluoride (LiF) as an additive were added to N-methylpyrrolidone (NMP) and mixed to thus prepare a positive electrode slurry. Here, particles having an average particle size of 1 μm were used as LiF. The prepared slurry was coated onto both surfaces of a current collector formed of an aluminum foil having a thickness of 15 μm. Subsequently, hot air was blown onto the slurry coating, coated onto the current collector, at 180° C. by using an air gun, whereby a surface (a coating surface) of a positive electrode layer was dried while being subjected to hot air. After that, the dried positive electrode layer was pressed to produce a positive electrode having an electrode density of 2.0 $g/cm^3$.

Next, a negative electrode was produced as follows. 100% by weight of a $Li_4Ti_5O_{12}$ powder as a negative electrode active material, 5% by weight of acetylene black as a conductive agent, and 5% by weight of polyvinylidene-fluoride (PVdF) as a binder were added to N-methylpyrrolidone (NMP) and mixed to thus prepare a negative electrode slurry. The prepared slurry was coated onto both surfaces of a current collector formed of an aluminum foil having a thickness of 15 μm. Subsequently, the current collector coated with the slurry was left to stand in a stationary state on a hot plate at 130° C. to dry a coating of the slurry. After that, a negative electrode layer obtained by drying the coating was pressed to produce a negative electrode having an electrode density of 2.0 $g/cm^3$.

<Production of Laminate Cell>

The produced positive electrode, a separator formed of a polyethylene porous film having a thickness of 25 μm, the produced negative electrode, and a separator were stacked in this order and then spirally wound. This was heat-pressed at 90° C. to produce a flat electrode group having a width of 30 mm and a thickness of 3.0 mm. The obtained electrode group was housed in a pack formed of a laminate film, and vacuum dried at 80° C. for 24 hours. The laminate film used in this example is constituted by forming polypropylene layers on both surfaces of an aluminum foil having a thickness of 40 μm. The total thickness of the laminate film was 0.1 mm. $LiPF_6$ as an electrolyte salt was dissolved at 1.2

M in a 1:1 mixed solution of polypropylene carbonate (PC) and diethyl carbonate (DEC) to prepare a liquid nonaqueous electrolyte. The liquid nonaqueous electrolyte was put into the pack formed of the laminate film housing the electrode group. Then, the pack was completely sealed off by heat sealing to manufacture a laminate cell-type nonaqueous electrolyte battery having a width of 35 mm, a thickness of 3.2 mm, and a height of 65 mm.

Example 2

A positive electrode was produced similarly to Example 1 except that the LiF particles used when the positive electrode slurry was prepared had a particle size of 500 μm. Further, a nonaqueous electrolyte battery was manufactured similarly to Example 1 except that this positive electrode was used.

Example 3

A positive electrode was produced similarly to Example 1 except that LiF was not mixed when a positive electrode slurry was prepared. Further, a negative electrode was produced similarly to Example 1 except that 5% by weight of LiF particles having an average particle size of 1 μm were added when a negative electrode slurry was prepared. A nonaqueous electrolyte battery was manufactured similarly to Example 1 except that the positive electrode and the negative electrode thus produced were used.

Comparative Example 1

A nonaqueous electrolyte battery was manufactured similarly to Example 1 except that when a positive electrode was produced, a positive electrode slurry was prepared without mixing LiF.

Comparative Example 2

A nonaqueous electrolyte battery was manufactured similarly to Example 1 except that when a positive electrode was produced, instead of blowing hot air onto a coating of a positive electrode slurry, a current collector coated with the positive electrode slurry was left to stand in a stationary state on a hot plate at 90° C. to dry the coating of the slurry.

Comparative Example 3

A nonaqueous electrolyte battery was manufactured similarly to Example 1 except that when a positive electrode slurry was prepared, the amount of LiF mixed was 15% by weight.

The following table 1 summarizes positive electrode active materials and negative electrode active materials used when the nonaqueous electrolyte batteries of Examples 1 to 3 and the nonaqueous electrolyte batteries of Comparative Examples 1 to 3 were manufactured, and whether LiF was added to the positive electrodes and the negative electrodes, or not.

TABLE 1

| | Positive electrode | | Negative electrode | |
|---|---|---|---|---|
| | Active material | Whether LiF is added | Active material | Whether LIF is added |
| Example 1 | $LiMn_{0.75}Fe_{0.20}Mg_{0.05}PO_4$ | added | $Li_4Ti_5O_{12}$ | not added |
| Example 2 | $LiMn_{0.75}Fe_{0.20}Mg_{0.05}PO_4$ | added | $Li_4Ti_5O_{12}$ | not added |
| Example 3 | $LiMn_{0.75}Fe_{0.20}Mg_{0.05}PO_4$ | not added | $Li_4Ti_5O_{12}$ | added |
| Comparative Example 1 | $LiMn_{0.75}Fe_{0.20}Mg_{0.05}PO_4$ | not added | $Li_4Ti_5O_{12}$ | not added |
| Comparative Example 2 | $LiMn_{0.75}Fe_{0.20}Mg_{0.05}PO_4$ | added | $Li_4Ti_5O_{12}$ | not added |
| Comparative Example 3 | $LiMn_{0.75}Fe_{0.20}Mg_{0.05}PO_4$ | added | $Li_4Ti_5O_{12}$ | not added |

Example 4

A nonaqueous electrolyte battery was manufactured similarly to Example 1 except that $LiNi_{1/3}Mn_{1/3}Co_{1/3}O_2$ as a positive electrode active material was used in production of a positive electrode, and $TiNb_2O_7$ as a negative electrode active material was used in production of a negative electrode.

Example 5

First, a positive electrode slurry was prepared similarly to Example 1 except that $LiNi_{1/3}Mn_{1/3}Co_{1/3}O_2$ was used as a positive electrode active material, and the amount of LiF was 1% by weight. The slurry was coated onto both surfaces of a current collector formed of an aluminum foil having a thickness of 15 μm, and an obtained coating was then dried. Next, a slurry in which the amount of LiF was changed to 5% by weight was coated onto the dried coating, and an obtained coating was then dried. In either case, hot air was blown at 120° C. onto the coating on one surface of the current collector to dry the coating.

A positive electrode was produced similarly to Example 1 except that slurries different in lithium fluoride concentration were thus used to form a positive electrode layer by coating twice. Further, a negative electrode was produced similarly to Example 1 except that $TiNb_2O_7$ was used as a negative electrode active material. A nonaqueous electrolyte battery was manufactured similarly to Example 1 except that the positive electrode and the negative electrode thus produced were used.

Comparative Example 4

A positive electrode was produced similarly to Example 1 except that when a positive electrode slurry was prepared, $LiNi_{1/3}Mn_{1/3}CO_{1/3}O_2$ was used as a positive electrode active material, and LiF was not mixed. Further, a negative electrode was produced similarly to Example 1 except that $TiNb_2O_7$ was used as a negative electrode active material when a negative electrode slurry was prepared. A nonaqueous electrolyte battery was manufactured similarly to Example 1 except that the positive electrode and the negative electrode thus produced were used.

The following table 2 summarizes positive electrode active materials and negative electrode active materials used when the nonaqueous electrolyte batteries of Examples 4 to 5 and the nonaqueous electrolyte battery of Comparative Example 4 were manufactured, and whether LiF was added to the positive electrodes and the negative electrodes, or not.

TABLE 2

|  | Positive electrode | | Negative electrode | |
| --- | --- | --- | --- | --- |
|  | Active material | Whether LiF is added | Active material | Whether LiF is added |
| Example 4 | $LiNi_{1/3}Mn_{1/3}Co_{1/3}O_2$ | added | $TiNb_2O_7$ | not added |
| Example 5 | $LiNi_{1/3}Mn_{1/3}Co_{1/3}O_2$ | added | $TiNb_2O_7$ | not added |
| Comparative Example 4 | $LiNi_{1/3}Mn_{1/3}Co_{1/3}O_2$ | not added | $TiNb_2O_7$ | not added |

Example 6

A nonaqueous electrolyte battery was manufactured similarly to Example 1 except that $LiMn_2O_4$ as a positive electrode active material was used in production of a positive electrode, and $Li_2NaTi_5NbO_{14}$ as a negative electrode active material was used in production of a negative electrode.

Example 7

A nonaqueous electrolyte battery was manufactured similarly to Example 6 except that when each of the positive electrode and the negative electrode was produced, the slurry was coated onto the current collector, respectively at twice a coating thickness.

Example 8

A nonaqueous electrolyte battery was manufactured similarly to Example 6 except that when a negative electrode slurry was prepared, 5% by weight of LiF particles having an average particle size of 1 μm was added.

Comparative Example 5

A positive electrode was produced similarly to Example 1 except that when a positive electrode slurry was prepared, $LiMn_2O_4$ was used as a positive electrode active material, and LiF was not mixed. Further, a negative electrode was produced similarly to Example 1 except that $Li_2NaTi_5NbO_{14}$ was used as a negative electrode active material when a negative electrode slurry was prepared. A nonaqueous electrolyte battery was manufactured similarly to Example 1 except that the positive electrode and the negative electrode thus produced were used.

Comparative Example 6

A nonaqueous electrolyte battery was manufactured similarly to Comparative Example 5 except that when each of the positive electrode and the negative electrode was produced, the slurry was coated onto the current collector, respectively at twice a coating thickness.

The following table 3 summarizes positive electrode active materials and negative electrode active materials used when the nonaqueous electrolyte batteries of Examples 6 to 8 and the nonaqueous electrolyte batteries of Comparative Examples 5 to 6 were manufactured, and whether LiF was added to the positive electrodes and the negative electrodes, or not.

TABLE 3

|  | Positive electrode | | Negative electrode | |
| --- | --- | --- | --- | --- |
|  | Active material | Whether LiF is added | Active material | Whether LiF is added |
| Example 6 | $LiMn_2O_4$ | added | $Li_2NaTi_5NbO_{14}$ | not added |
| Example 7 | $LiMn_2O_4$ | added | $Li_2NaTi_5NbO_{14}$ | not added |
| Example 8 | $LiMn_2O_4$ | added | $Li_2NaTi_5NbO_{14}$ | added |
| Comparative Example 5 | $LiMn_2O_4$ | not added | $Li_2NaTi_5NbO_{14}$ | not added |
| Comparative Example 6 | $LiMn_2O_4$ | not added | $Li_2NaTi_5NbO_{14}$ | not added |

<Qualitative Analysis of Lithium Fluoride in Electrode Layer>

The positive electrodes produced in Examples 1 to 2 and 4 to 7 and Comparative Examples 1 to 6, the negative electrode produced in Example 3, and the positive electrode and the negative electrode produced in Example 8 were subjected to qualitative analysis of lithium fluoride (LiF) using the above-described SAICAS method.

Specifically, first, the thickness of the target electrode was measured using the above procedure to examine the thickness of the electrode mixed-materials layer. From this measurement, in Examples 1 to 6 and 8 and Comparative Examples 1 to 5, the thickness of the electrode mixed-materials layer was 25 μm. On the other hand, in Example 7 and Comparative Example 6, the thickness of the electrode mixed-materials layer was 50 μm.

Next, in Examples 1 to 6 and 8 and Comparative Examples 1 to 5, the electrode mixed-materials layer was cut out to a depth of 5 μm of a surface layer of the target electrode to be used as a sample of a thickness region to a depth of 5 μm from the surface layer of the electrode. In other words, samples of the second region of the electrode layer were thus collected. Moreover, the same portion from which the 5 μm sample near the surface layer was cut was cut by 15 μm, and the remaining mixed-materials layer was then peeled from a current collector to be used as a sample of a thickness region to a depth of 5 μm from an interface between an electrode layer and the current collector. In other words, samples of the first region of the electrode layer were thus collected. Here, these sampling operations were performed with reference to 25 μm being the thickness of the mixed-materials layer measured from the electrode thickness measurement, and the respective results actually showed good consistency with the 20% thickness near the surface layer of the electrode layer and the 20% thickness near the interface between the electrode layer and the current collector. For each electrode, this operation was repeated plural times, whereby 5 mg of a sample in the 20% thickness region near the surface layer of the electrode layer and 5 mg of a sample in the 20% thickness region near the interface with the current collector were collected. Each of the collected samples was subjected to qualitative analysis by the above-described XRD analysis to examine the presence of LiF in the electrode layer.

In Example 7 and Comparative Example 6, the electrode mixed-materials layer was cut out to a depth of 10 μm at a surface layer of the target electrode, to be used as a sample of the 20% thickness region near the surface layer of the electrode layer. In other words, samples of the second region of the electrode layer were thus collected. The same portion from which this sample was cut was cut by 30 μm, and the mixed-materials layer peeled from a current collector after cutting was used as a sample of the 20% thickness region near the interface with the current collector. In other words, samples of the first region of the electrode layer were thus collected. The operation of cutting out these samples was repeated to collect 5 mg of each sample. Each of the collected samples was subjected to qualitative analysis by the above-described XRD analysis to examine the presence of LiF in the electrode layer.

<Quantitative Analysis of Lithium Fluoride>

Next, each sample collected by the SAICAS method was subjected to quantitative analysis by the above-described ICP analysis. Regarding Examples 1 to 3 and Comparative Examples 1 to 3, the following Table 4 shows results obtained from the analysis of the samples collected from the positive electrodes or the negative electrodes.

TABLE 4

| | | Content of LIF in electrode layer | |
| --- | --- | --- | --- |
| | Electrode | 20% thickness region near surface (% by weight) | 20% thickness region near interface with current collector (% by weight) |
| Example 1 | Positive electrode | 3.1 | 0.5 |
| Example 2 | Positive electrode | 6.3 | 0.4 |
| Example 3 | Negative electrode | 2.4 | 1.0 |
| Comparative Example 1 | Positive electrode | 0.3 | 0.2 |
| Comparative Example 2 | Positive electrode | 5.2 | 3.9 |
| Comparative Example 3 | Positive electrode | 15.3 | 5.0 |

As shown in Table 4, in the positive electrodes produced in Examples 1 to 2 and the negative electrode produced in Example 3, the content of lithium fluoride in the 20% thickness region near the surface layer of the electrode layer was in a range of from 2% by weight to 10% by weight, and the content of lithium fluoride in the 20% thickness region near the interface with the current collector in the electrode layer was 0.02% by weight or more and less than 2% by weight.

On the other hand, in the positive electrode produced in Comparative Example 1, the respective contents of lithium fluoride in the 20% thickness region near the surface layer of the positive electrode layer and the 20% thickness region near the interface with the current collector in the positive electrode layer were each less than 2% by weight. In Comparative Example 1, it is considered that since lithium fluoride was not mixed when the positive electrode slurry was prepared, the content of lithium fluoride was low over the entire positive electrode layer.

In the positive electrode produced in Comparative Example 2, the respective contents of lithium fluoride in the region near the surface layer of the positive electrode layer and the region near the interface with the current collector were each 2% by weight or more. In Comparative Example 2, it is considered that when the coating of the positive electrode slurry was dried, since drying was performed using a hot plate at such a relatively low temperature as 90° C., distribution of lithium fluoride could not be satisfactorily biased.

In the positive electrode produced in Comparative Example 3, the content of lithium fluoride in the region near the surface layer of the positive electrode layer was more than 10% by weight, and the content of lithium fluoride in the region near the interface with the current collector was more than 2% by weight. In Comparative Example 3, it is considered that although distribution of lithium fluoride had been biased because drying was performed using similar means to those in Example 1, since the content of lithium fluoride mixed in the positive electrode slurry was high, the content of lithium fluoride in the positive electrode layer was generally high.

Regarding Examples 4 to 5 and Comparative Example 4, the following Table 5 shows results obtained from the analysis of the samples collected from the positive electrodes.

TABLE 5

| | | Content of LIF in electrode layer | |
| --- | --- | --- | --- |
| | Electrode | 20% thickness region near surface (% by weight) | 20% thickness region near interface with current collector (% by weight) |
| Example 4 | Positive electrode | 5.8 | 0.8 |
| Example 5 | Positive electrode | 5.0 | 0.9 |
| Comparative Example 4 | Positive electrode | 0.2 | 0.1 |

As shown in Table 5, as in Examples 1 to 2, in the positive electrodes produced in Examples 4 to 5, the content of lithium fluoride in the 20% thickness region near the surface layer of the positive electrode layer was in a range of from 2% by weight to 10% by weight, and the content of lithium fluoride in the 20% thickness region near the interface with the current collector in the positive electrode layer was from 0.02% by weight to less than 2% by weight.

On the other hand, in the positive electrode produced in Comparative Example 4, the respective contents of lithium fluoride in the 20% thickness region near the surface layer of the positive electrode layer and the 20% thickness region near the interface with the current collector in the positive electrode layer were each less than 2% by weight. In Comparative Example 4, as in Comparative Example 1, it is considered that since lithium fluoride was not mixed when the positive electrode slurry was prepared, the content of lithium fluoride was low over the entire positive electrode layer.

Regarding Examples 6 to 8 and Comparative Examples 5 to 6, the following Table 6 shows results obtained from the analysis of the samples collected from the positive electrodes and the negative electrodes.

TABLE 6

| | Electrode | Content of LiF in electrode layer | |
|---|---|---|---|
| | | 20% thickness region near surface (% by weight) | 20% thickness region near interface with current collector (% by weight) |
| Example 6 | Positive electrode | 5.6 | 1.2 |
| Example 7 | Positive electrode | 5.8 | 0.8 |
| Example 8 | Positive electrode | 5.6 | 1.2 |
| | Negative electrode | 5.8 | 1.6 |
| Comparative Example 5 | Positive electrode | 0.2 | 0.2 |
| Comparative Example 6 | Positive electrode | 0.2 | 0.3 |

As shown in Table 6, in the positive electrodes produced in Examples 6 to 8 and the negative electrode produced in Example 8, the content of lithium fluoride in the 20% thickness region near the surface layer of the electrode layer was in a range of from 2% by weight to 10% by weight, and the content of lithium fluoride in the 20% thickness region near the interface with the current collector in the electrode layer was in a range of 0.02% by weight or more and less than 2% by weight.

On the other hand, in the positive electrodes produced in Comparative Examples 5 to 6, the respective contents of lithium fluoride in the 20% thickness region near the surface layer of the positive electrode layer and the 20% thickness region near the interface with the current collector in the positive electrode layer were each less than 2% by weight. In Comparative Examples 5 to 6, as in Comparative Examples 1 and 4, it is considered that since lithium fluoride was not mixed when the positive electrode slurry was prepared, the content of lithium fluoride was low over the entire positive electrode layer.

<Performance Evaluation>

For the nonaqueous electrolyte batteries produced in Examples 1 to 8 and Comparative Examples 1 to 6, the life performances under high temperature conditions were evaluated. Specifically, each battery was first charged to 2.7 V at a constant current of 1 C at a temperature of 25° C., and then charged at constant voltage, to thereby perform constant current-constant voltage charging. This state was regarded as SOC 100%. After that, the capacity obtained when the battery was discharged to 1.5 V at a current value of 1 C was measured. The capacity thus obtained was used as an initial charge-discharge capacity.

Next, charging and discharging were performed in 500 cycles in a voltage range of 1.5 V to 2.7 V at a charge current rate of 1 C and a discharge current rate of 1 C at a temperature of 60° C. Here, one cycle includes one charging and one discharging. The nonaqueous electrolyte battery charged and discharged for 500 cycles was then subjected again to constant current-constant voltage charging, in which the battery was charged to 2.7 V at a constant current of 1 C at a temperature of 25° C. and thereafter charged at a constant voltage, followed by discharging to 1.5 V at 1 C current. Thus, the charge-discharge capacity after 500 cycles was measured.

A value obtained by dividing the charge-discharge capacity after 500 cycles by the initial charge-discharge capacity was calculated as a capacity retention ratio after 500 cycles at 60° C. The following Table 7 summarizes the capacity retention ratios after 500 cycles at 60° C. obtained in the nonaqueous electrolyte batteries of Examples 1 to 3 and Comparative Examples 1 to 3.

TABLE 7

| | Capacity retention ratio after 500 cycles at 60° C. (%) |
|---|---|
| Example 1 | 96.2 |
| Example 2 | 97.1 |
| Example 3 | 95.0 |
| Comparative Example 1 | 90.8 |
| Comparative Example 2 | 92.2 |
| Comparative Example 3 | 75.9 |

As shown in Table 7, in Examples 1 to 3 and Comparative Examples 1 to 3, although the active materials used in the positive electrode and the negative electrode were the same, the capacity retention ratios after 500 cycles at 60° C. in the nonaqueous electrolyte batteries of Comparative Examples 1 to 3 were lower than those in the nonaqueous electrolyte batteries of Examples 1 to 3.

The following Table 8 summarizes the capacity retention ratios after 500 cycles at 60° C. obtained in the nonaqueous electrolyte batteries of Examples 4 to 5 and Comparative Example 4.

TABLE 8

| | Capacity retention ratio after 500 cycles at 60° C. (%) |
|---|---|
| Example 4 | 93.1 |
| Example 5 | 92.5 |
| Comparative Example 4 | 87.4 |

As shown in Table 8, similarly to comparison of Examples 1 to 3 and Comparative Examples 1 to 3, in Examples 4 to 5 and Comparative Example 4, although the active materials used in the positive electrode and the negative electrode were the same, the capacity retention ratio after 500 cycles at 60° C. in the nonaqueous electrolyte battery of Comparative Example 4 was lower than those in the nonaqueous electrolyte batteries of Examples 4 to 5.

The following Table 9 summarizes the capacity retention ratios after 500 cycles at 60° C. obtained in the nonaqueous electrolyte batteries of Examples 6 to 8 and Comparative Examples 5 to 6.

TABLE 9

| | Capacity retention ratio after 500 cycles at 60° C. (%) |
|---|---|
| Example 6 | 88.5 |
| Example 7 | 86.2 |
| Example 8 | 90.4 |
| Comparative Example 5 | 83.9 |
| Comparative Example 6 | 78.5 |

As shown in Table 9, also in Examples 6 to 8 and Comparative Examples 5 to 6, although the active materials used in the positive electrode and the negative electrode were the same, the capacity retention ratios after 500 cycles at 60° C. in the nonaqueous electrolyte batteries of Comparative Examples 5 to 6 were lower than those in the nonaqueous electrolyte batteries of Examples 6 to 8. Note that, as shown in Table 6, for both the positive electrode and the negative electrode in Example 8, the LiF content was in a range of from 2% by weight to 10% by weight in the region near the surface layer of the electrode layer, and was in a range of 0.02% by weight or more to less than 2% by weight in the region near the interface with the current collector. Among Examples 6 to 8, the capacity retention ratio after 500 cycles at 60° C. in the nonaqueous electrolyte battery of Example 8 was highest.

The above results of Examples and Comparative Examples show that in the nonaqueous electrolyte battery which includes, as at least one of the positive electrode and the negative electrode, the electrode including lithium fluoride in an amount of from 2% by weight to 10% by weight in the 20% thickness region near the surface layer of the electrode layer, and in an amount of from 0.02% by weight to 2% by weight in the electrode layer in the 20% thickness region near the interface with the current collector, high temperature cycle performance is stabilized.

The following Examples 9 to 11 and Comparative Examples 7 to 8 show the results of examining the effect that is brought about by exhibition of a gradient in which the concentration distribution of lithium fluoride in the electrode layer consistently changes in the thickness direction, as described in the first embodiment.

Example 9

A nonaqueous electrolyte battery was manufactured similarly to Example 1 except that a positive electrode was produced using $LiMn_2O_4$ as a positive electrode active material.

Example 10

First, a positive electrode slurry was prepared similarly to Example 1 except that $LiMn_2O_4$ was used as a positive electrode active material, and the amount of LiF was 1% by weight. The slurry was coated onto both surfaces of a current collector formed of an aluminum foil having a thickness of 15 μm, and an obtained coating was then dried. Next, a slurry in which the amount of LiF was changed to 10% by weight was coated onto the dried coating, and an obtained coating was then dried. Further, a slurry in which the amount of LiF was changed to 5% by weight was coated onto the dried coating, and an obtained coating was then dried. In any case, hot air was blown at 120° C. onto the coating on one surface to dry the coating.

A positive electrode was produced similarly to Example 1 except that slurries different in lithium fluoride concentration were thus coated in three separate stages to form a positive electrode layer. A nonaqueous electrolyte battery was manufactured similarly to Example 1 except that the positive electrode thus produced was used.

Example 11

First, a positive electrode slurry was prepared similarly to Example 1 except that $LiMn_2O_4$ was used as a positive electrode active material, and the amount of LiF was 1% by weight. The slurry was coated onto both surfaces of a current collector formed of an aluminum foil having a thickness of 15 μm, and an obtained coating was then dried. Next, a slurry in which the amount of LiF was changed to 0% by weight was coated onto the dried coating (that is, a slurry with no LiF added), and an obtained coating was then dried. Further, a slurry in which the amount of LiF was changed to 5% by weight was coated onto the dried coating, and an obtained coating was then dried. In any case, hot air was blown at 120° C. onto the coating on one surface to dry the coating.

A positive electrode was produced similarly to Example 1 except that slurries different in lithium fluoride concentration were thus coated in three separate stages to form a positive electrode layer. A nonaqueous electrolyte battery was manufactured similarly to Example 1 except that the positive electrode thus produced was used.

Comparative Example 7

A nonaqueous electrolyte battery was manufactured similarly to Example 1 except that in producing a positive electrode, $LiMn_2O_4$ as a positive electrode active material was used, and a positive electrode slurry was prepared without mixing lithium fluoride.

Comparative Example 8

A nonaqueous electrolyte battery was manufactured similarly to Example 1 except that in producing a positive electrode, $LiMn_2O_4$ as a positive electrode active material was used, and a positive electrode slurry was prepared without mixing lithium fluoride, and that 5% by weight of lithium fluoride was added to a liquid nonaqueous electrolyte.

The following table 10 summarizes the positive electrode active materials and the negative electrode active materials used when the nonaqueous electrolyte batteries of Examples 9 to 11 and Comparative Examples 7 to 8 were manufactured, and whether LiF was added to the positive electrodes and the negative electrodes, or not.

TABLE 10

| | Positive electrode | | Negative electrode | |
|---|---|---|---|---|
| | Active material | Whether LiF is added | Active material | Whether LiF is added |
| Example 9 | $LiMn_2O_4$ | added | $Li_4Ti_5O_{12}$ | not added |
| Example 10 | $LiMn_2O_4$ | added | $Li_4Ti_5O_{12}$ | not added |
| Example 11 | $LiMn_2O_4$ | added | $Li_4Ti_5O_{12}$ | not added |
| Comparative Example 7 | $LiMn_2O_4$ | not added | $Li_4Ti_5O_{12}$ | not added |
| Comparative Example 8 | $LiMn_2O_4$ | not added | $Li_4Ti_5O_{12}$ | not added |

In the positive electrodes produced in Examples 9 to 11 and Comparative Examples 7 to 8 manufactured as above, samples of the 20% thickness region near the surface layer of the positive electrode layer were collected as in Examples 1 to 6 and 8 and Comparative Examples 1 to 5. In other words, samples of the second region of the electrode layer were thus collected.

Moreover, at the same portion from which the sample was cut out, the electrode mixed-materials layer to a depth of 15 μm was cut out, and the cut out electrode mixed-materials layer was collected as a sample of an intermediate region between the region near the surface layer in the positive electrode layer and the region near the interface with the current collector. In other words, samples of the third region of the electrode layer were thus collected.

After that, the remaining mixed-materials layer was peeled from the current collector to be used as a sample of a thickness region of 5 µm from the interface between the electrode layer and the current collector. In other words, samples of the first region of the electrode layer were thus collected.

Each of the collected samples was subjected to qualitative analysis and quantitative analysis of lithium fluoride as in Examples 1 to 8 and Comparative Examples 1 to 5.

Regarding Examples 9 to 11 and Comparative Examples 7 to 8, the following Table 11 shows results obtained from the analysis of the samples collected from the positive electrodes.

| | Content of LiF in positive electrode layer | | |
|---|---|---|---|
| | 20% thickness region near surface (% by weight) | Intermediate region between 20% thickness region near surface and 20% thickness region near interface with current collector (% by weight) | 20% thickness region near interface with current collector (% by weight) |
| Example 9 | 3.1 | 1.6 | 0.5 |
| Example 10 | 4.9 | 9.6 | 0.8 |
| Example 11 | 4.8 | 0.1 | 0.9 |
| Comparative Example 7 | 0.1 | 0.2 | 0.1 |
| Comparative Example 8 | 0.4 | 0.4 | 0.3 |

As shown in Table 11, in Example 9, as in Example 1, when the positive electrode was produced, the coating of the positive electrode slurry was dried with hot air, so that a concentration gradient in which the content of lithium fluoride gradually decreases from the surface layer of the electrode toward the current collector had been obtained. In Examples 10 and 11, when the positive electrode was produced, coating and drying of the positive electrode slurry were performed in three separate stages, so that a concentration distribution different from that in Example 9 had been obtained.

In Comparative Example 7, since lithium fluoride was not added to the positive electrode slurry, the content of lithium fluoride was low over the entire positive electrode layer. In Comparative Example 8, since lithium fluoride was added to a liquid nonaqueous electrolyte, although the amount of lithium fluoride included in the positive electrode layer was higher than that in Comparative Example 7, the concentration distribution of lithium fluoride was substantially uniform over the entire positive electrode layer. The analysis results of the positive electrode in Example 8 showed that it was difficult to obtain a concentration gradient with a biased lithium fluoride distribution in the electrode layer even if lithium fluoride was added to a liquid electrolyte.

(Performance Evaluation)

First, similarly to Examples 1 to 8 and Comparative Examples 1 to 6, the initial charge-discharge capacity was measured. Next, each of the nonaqueous electrolyte batteries manufactured in Examples 9 to 11 and Comparative Examples 7 to 8 was discharged to 1.3 V at a rate of 0.2 C from a state in which SOC was 100%. Charging was performed such that the battery capacity was 50% based on an initial discharge capacity, so that each of the nonaqueous electrolyte batteries was adjusted such that SOC was 50%. Then, an initial DC (direct current) resistance at SOC of 50% was measured.

Subsequently, similarly to Examples 1 to 8 and Comparative Examples 1 to 6, the nonaqueous electrolyte batteries of Examples 9 to 11 and Comparative Examples 7 to 8 were subjected to a charge-discharge test at 60° C. in 500 cycles. After that, a charge-discharge capacity after 0.500 cycles at 60° C. was obtained, and this charge-discharge capacity was divided by the initial charge-discharge capacity to calculate a capacity retention ratio after 500 cycles at 60° C.

Moreover, the DC resistance at SOC of 50% after 500 cycles at 60° C. was measured. A resistance increase ratio after 500 cycles at 60° C. was calculated based on the measured DC resistance and the initial DC resistance at SOC of 50%.

The following Table 12 summarizes the capacity retention ratio and the resistance increase ratio after 500 cycles at 60° C. thus obtained.

TABLE 12

| | Capacity retention ratio after 500 cycles at 60° C. (%) | Resistance increase ratio after 500 cycles at 60° C. (%) |
|---|---|---|
| Example 9 | 90.2 | 14.4 |
| Example 10 | 89.5 | 22.8 |
| Example 11 | 88.4 | 16.7 |
| Comparative Example 7 | 79.9 | 28.6 |
| Comparative Example 8 | 81.2 | 30.2 |

As shown in Table 12, among Examples 9 to 11, after 500 cycles at 60° C., the capacity retention ratio of the nonaqueous electrolyte battery of Example 9 was highest, and the resistance increase ratio was lowest. As described above, in Example 9, the amount of lithium fluoride in the positive electrode layer was highest near the surface layer, gradually decreases toward the current collector, and was lowest near the current collector. On the other hand, in Example 10, although the content of lithium fluoride in the region near the surface layer was higher than that in the region near the current collector, the content of lithium fluoride in a region between these regions was high. In Example 11, compared to the content of lithium fluoride in the region near the surface layer in the positive electrode layer and the content of lithium fluoride in the region near the current collector, the content in a region between these regions was low. Namely, unlike Example 9, in Examples 10 and 11, a gradient in which the amount of lithium fluoride included in the positive electrode layer consistently decreases from the surface layer toward the current collector was not obtained. Also in Comparative Example 7, the content of lithium fluoride in an intermediate region between the region near the surface layer of the positive electrode layer and the region near the current collector was relatively high.

The above results of Examples 9, 10, and 11 and Comparative Example 7 show that when the lithium fluoride concentration in the electrode layer consistently changes in the electrode thickness direction, it is effective for improving the cycle performance under high temperature conditions and suppressing the resistance increase.

From the results of Comparative Example 8, when lithium fluoride was added to a nonaqueous electrolyte, the resistance increase ratio tended to become high. With regard to the increase in resistance increase ratio, considerable causes include precipitation of lithium fluoride as a result of exceeding the solvation limit, leading to clogging of the separator.

According to at least one embodiment and Example described above, an electrode is provided. The electrode includes a current collector and an electrode layer. The electrode layer is disposed on the current collector and includes lithium fluoride. A first content of lithium fluoride based on a weight of the electrode layer in a first region of the electrode layer is within a range of 0.02% by weight or more and less than 2% by weight. The first region is adjacent to an interface between the electrode layer and the current collector, and has a first thickness equal to 20% with respect to a thickness of the electrode layer. Further, a second content of lithium fluoride in a second region of the electrode layer is within a range of from 2% by weight to 10% by weight. The second region is adjacent to a surface on a reverse side of the electrode layer with respect to the interface between the electrode layer and the current collector, and has the first thickness. The electrode having the above configuration can achieve a nonaqueous electrolyte battery exhibiting excellent life performance even under high temperature conditions, a battery pack including the nonaqueous electrolyte battery, and a vehicle including the battery pack.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electrode comprising:
a current collector; and
an electrode layer disposed on the current collector and including lithium fluoride,
wherein a first content of lithium fluoride based on a weight of the electrode layer in a first region of the electrode layer is within a range of 0.02% by weight or more and less than 2% by weight, the first region being adjacent to an interface between the electrode layer and the current collector, and having a first thickness equal to 20% with respect to a thickness of the electrode layer,
and a second content of lithium fluoride based on a weight of the electrode layer in a second region of the electrode layer is within a range of from 2% by weight to 10% by weight, the second region being adjacent to a surface on a reverse side of the electrode layer with respect to the interface between the electrode layer and the current collector, and having the first thickness.

2. The electrode according to claim 1, wherein a third content of lithium fluoride in a third region of the electrode layer between the first region and the second region is within a range of from the first content of lithium fluoride to the second content of lithium fluoride.

3. The electrode according to claim 1, wherein the electrode layer includes a first layer and a second layer, the first layer including the first region, and the second layer including the second region.

4. A nonaqueous electrolyte battery comprising:
a positive electrode;
a negative electrode including an active material, the active material including a titanium-containing oxide; and
a nonaqueous electrolyte,
wherein at least one of the positive electrode and the negative electrode includes the electrode according to claim 1.

5. The nonaqueous electrolyte battery according to claim 4, wherein the titanium-containing oxide includes at least one selected from the group consisting of spinel type lithium titanate, monoclinic β type titanium oxide, $Ti_{1-x}M1_xNb_{2-y}M2_yO_{7-\delta}$, where $0 \le x < 1$, $0 \le y < 1$, $-0.5 \le \delta \le 0.5$, M1 is at least one selected from the group consisting of Mg, Fe, Ni, Co, W, Ta, and Mo, and M2 is at least one selected from the group consisting of Mg, Fe, Ni, Co, W, Ta, and Mo, and orthorhombic type Na-containing niobium titanium composite oxide represented by $Li_{2+v}Na_{2-w}M1_xTi_{6-y-z}Nb_yM2_zO_{14+\delta}$, where $0 \le v \le 4$, $0 < w < 2$, $0 \le x < 2$, $0 < y < 6$, $0 \le z < 3$, $y+z < 6$, $-0.5 \le \delta \le 0.5$, M1 is at least one selected from the group consisting of Cs, K, Sr, Ba, and Ca, and M2 is at least one selected from the group consisting of Zr, Sn, V, Ta, Mo, W, Fe, Co, Mn, and Al.

6. The nonaqueous electrolyte battery according to claim 4, wherein the positive electrode includes, as a positive electrode active material, at least one selected from the group consisting of $LiMn_{1-x-y}Fe_xA_yPO_4$, where $0 \le x \le 1$, $0 \le y \le 0.1$, and A is at least one element selected from the group consisting of Mg, Ca, Al, Ti, Zn, and Zr, $LiNi_xMn_yCo_{1-x-y}O_2$, where $0.3 \le x \le 0.8$ and $0.1 \le y \le 0.4$, a spinel structure manganese oxide $LiMn_2O_4$, and $LiMO_2$, where M is at least one element selected from the group consisting of Ni, Co, and Mn.

7. A battery pack comprising the nonaqueous electrolyte battery according to claim 4.

8. The battery pack according to claim 7 further comprising:
an external power distribution terminal; and
a protective circuit.

9. The battery pack according to claim 7, comprising a plural of the nonaqueous electrolyte batteries, the nonaqueous electrolyte batteries being electrically connected in series, in parallel, or in a combination of in a series and in parallel.

10. A vehicle comprising the battery pack according to claim 7.

11. The vehicle according to claim 10, wherein the battery pack is configured to recover a regenerative energy of a power of the vehicle.

* * * * *